United States Patent
Hwang et al.

(10) Patent No.: US 11,122,576 B2
(45) Date of Patent: *Sep. 14, 2021

(54) METHOD AND APPARATUS FOR INDICATING PREEMPTED RESOURCE INFORMATION

(71) Applicant: LG ELECTRONICS INC., Seoul (KR)

(72) Inventors: Daesung Hwang, Seoul (KR); Ilmu Byun, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 534 days.

This patent is subject to a terminal disclaimer.

(21) Appl. No.: 16/065,096

(22) PCT Filed: Feb. 1, 2018

(86) PCT No.: PCT/KR2018/001380

§ 371 (c)(1),
(2) Date: Sep. 13, 2018

(87) PCT Pub. No.: WO2018/143689

PCT Pub. Date: Aug. 9, 2018

(65) Prior Publication Data

US 2021/0212067 A1    Jul. 8, 2021

Related U.S. Application Data

(60) Provisional application No. 62/454,008, filed on Feb. 2, 2017, provisional application No. 62/469,454, filed (Continued)

(51) Int. Cl.
*H04W 72/04*    (2009.01)
*H04L 5/00*    (2006.01)

(52) U.S. Cl.
CPC ..... *H04W 72/0493* (2013.01); *H04W 72/042* (2013.01); *H04W 72/0446* (2013.01); *H04W 72/0453* (2013.01)

(58) Field of Classification Search
CPC .......... H04W 72/0493; H04W 72/042; H04W 72/0446; H04W 72/0453
See application file for complete search history.

(56) References Cited

U.S. PATENT DOCUMENTS 8,914,047 B1    12/2014 Tyler
2009/0181689 A1    7/2009 Lee et al.
(Continued)

FOREIGN PATENT DOCUMENTS

EP    3567774    11/2019
KR    10-2019-0032906    3/2019

OTHER PUBLICATIONS

Derya Malak et al., 'Fundamental Limits of Random Access Communication with Retransmissions', IEEE ICC 2017 Communications Symposium, 2017, pp. 1-7. (Year: 2017).*

(Continued)

*Primary Examiner* — Melvin C Marcelo
(74) *Attorney, Agent, or Firm* — Lee, Hong, Degerman, Kang & Waimey

(57) ABSTRACT

A method for receiving a signal in a user equipment (UE) from a base station (BS) in a wireless communication system is disclosed. The method comprises the steps of configuring a plurality of intervals of a specific time region for indicating whether to transmit the signal, through a higher layer; receiving an indicator for indicating whether to transmit the signal, for each of the plurality of intervals; and receiving a signal in each of the plurality of intervals in accordance with indication of the received indicator, wherein at least one of the plurality of intervals of the specific time region may have a first size, and the other (Continued)

(A)

(B)

intervals except the at least one interval may have a second size.

12 Claims, 11 Drawing Sheets

Related U.S. Application Data on Mar. 9, 2017, provisional application No. 62/539,490, filed on Jul. 31, 2017, provisional application No. 62/555,627, filed on Sep. 7, 2017, provisional application No. 62/565,052, filed on Sep. 28, 2017, provisional application No. 62/616,413, filed on Jan. 11, 2018.

(56) References Cited

U.S. PATENT DOCUMENTS

2013/0107835 A1    5/2013  Aiba et al.
2020/0169319 A1*   5/2020  Kim .................. H04W 72/0446

OTHER PUBLICATIONS

Samsung, "Summary of Email discussion on [NRAH2-08] Down-selection of CBG-based (re)transmission", R1-1713640, 3GPP TSG RAN WG1 Meeting #90, Aug. 2017, 19 pages.
Samsung, "Summary of e-mail discussions on multiplexing eMBB and URLLC in DL", 3GPP TSG RAN WG1 NR Ad-hoc Meeting, R1-1700972, Jan. 2017, 23 pages.
Huawei, et al., "On pre-emption indication for DL multiplexing of URLLC and eMBB", 3GPP TSG RAN WG1 Ad Hoc Meeting R1-1715409, Sep. 2017, 15 pages.
Huawei, et al., "On pre-emption indication for DL multiplexing of URLLC and eMBB", 3GPP TSG RAN WG1 Meeting #90, R1-1712204, Aug. 2017, 8 pages.
Huawei, et al., "Discussion on configuration and design of group common pre-emption Indication", 3GPP TSG RAN WG1 Meeting #90, R1-1713754, Aug. 2017, 8 pages.
U.S. Appl. No. 16/814,766, Office Action dated May 21, 2020, 13 pages.
PCT International Application No. PCT/KR2018/001380, Written Opinion of the International Searching Authority dated May 28, 2018, 11 pages.
Zte, et al., "About URLLC and eMBB multiplexing in downlink", 3GPP TSG RAN WG1 AH_NR Meeting, R1-1700264, Jan. 2017, 11 pages.
Samsung, "Indication of Reserved Resources", 3GPP TSG RAN WG1 NR Ad-Hoc Meeting, R1-1700994, Jan. 2017, 4 pages.
Sequans Communications, "On dynamic resource sharing between URLLC and eMBB in DL", 3GPP TSG RAN WG1 AH_NR Meeting, R1-1700642, Jan. 2017, 7 pages.
Mediatek, "URLLC and eMBB DL Multiplexing using CRC masking and multibit NACK feedback", 3GPP TSG RAN WG1 AH_NR Meeting, R1-1700176, Jan. 2017, 6 pages.
Lenovo, "Overview on URLLC design and the coexistence with eMBB", 3GPP TSG RAN WG1 NR Ad-Hoc Meeting, R1-1700554, Jan. 2017, 10 pages.
Guangdong OPPO Mobile Telecom, "On multiplexing eMBB and URLLC in DL", 3GPP TSG RAN WG1 NR AdHoc Meeting, R1-1700572, Jan. 2017, 5 pages.
Huawei, et al., "On DL multiplexing of URLLC and eMBB transmissions", 3GPP TSG RAN WG1 Adhoc Meeting, R1-1700022, Jan. 2017, 12 pages.
Korean Intellectual Property Office Application No. 10-2018-7022628, Office Action dated Aug. 1, 2019, 3 pages.
LG Electronics, "Remaining issues on pre-emption indication for downlink", 3GPP TSG RAN WG1 Meeting NR#3, R1-1715890, Sep. 2017, 10 pages.
European Patent Office Application Serial No. 18748558.6, Search Report dated Aug. 11, 2020, 12 pages.
Japan Patent Office Application No. 2019-533403, Office Action dated Aug. 25, 2020, 5 pages.
LG Electronics, "Discussion on multiplexing of eMBB and URLLC", R1-1700512, 3GPP TSG RAN WG1 NR Ad-hoc Meeting, Jan. 2017, 10 pages.
Nokia, Alcatel-Lucent Shanghai Bell, "On the mini-slot design in NR", R1-1701052, 3GPP TSG-RAN WG1#NR, Jan. 2017, 8 pages.
Japan Patent Office Application No. 2019-533403, Final Office Action dated Mar. 23, 2021, 4 pages.
LG Electronics, "Consideration on CBG construction for NR HARQ", R1-1710329, 3GPP TSG RAN WG1 Meeting NR Ad-Hoc#2, Jun. 2017, 4 pages.

* cited by examiner

FIG. 1
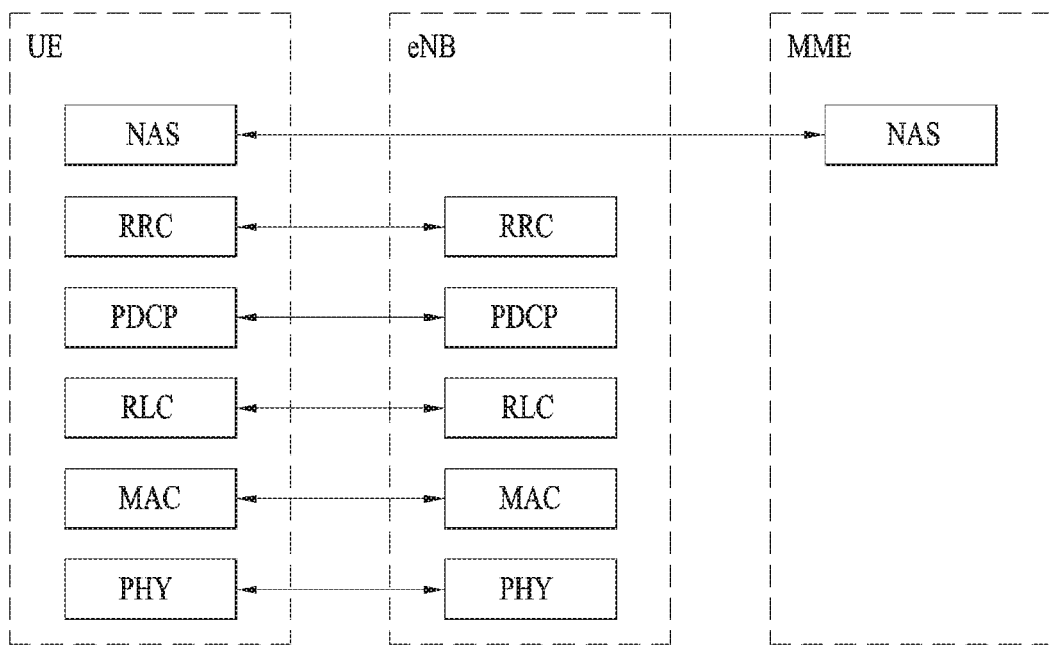
(A) CONTROL-PLANE PROTOCOL STACK
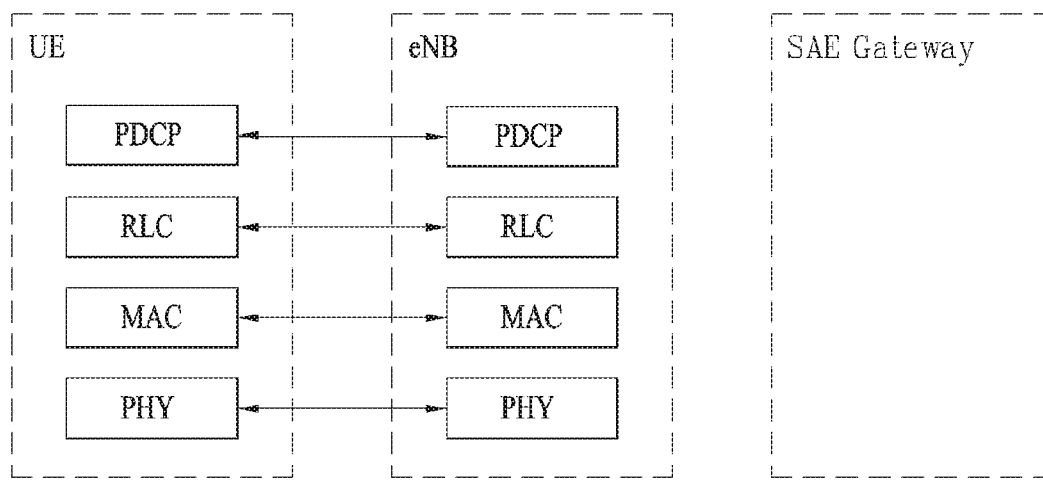
(B) USER-PLANE PROTOCOL STACK

FIG. 8

| Option \ Reference time region | 1 | 2 | 4 | 8 |
|---|---|---|---|---|
| Option 1 | 7 | 14 | 28 | 56 |
| Option 2 with N=2 | 5 | 7 | 9 | 11 |
| Option 2 with N=3 | 6 | 9 | 12 | 15 |
| Option 3-1 with M=1 | 7 | 8 | 9 | 10 |
| Option 3-1 with M=2 | N/A | 15 | 16 | 17 |
| Option 3-2 with N=1, M=1 | 3 | 4 | 5 | 6 |
| Option 3-2 with N=2, M=1 | 5 | 6 | 7 | 8 |
| Option 3-2 with N=2, M=2 | N/A | 8 | 9 | 10 |
| Option 3-2 with N=3, M=2 | N/A | 10 | 11 | 12 |
| Option 4 | 7 | 9 | 11 | 15 |

FIG. 10
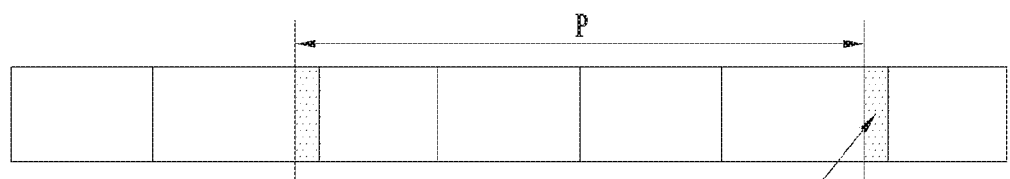
(a) P > X
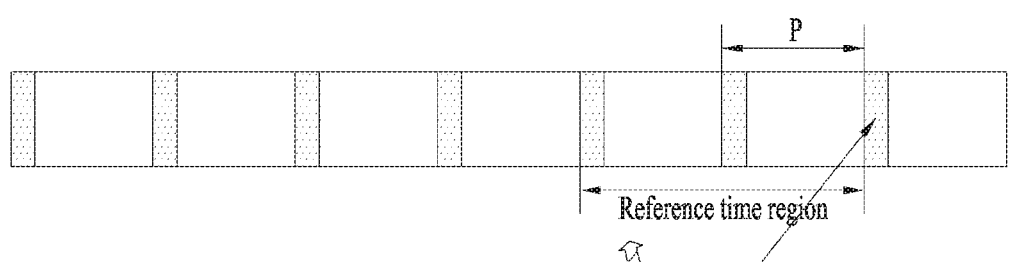
(b) P ≤ X

FIG. 11
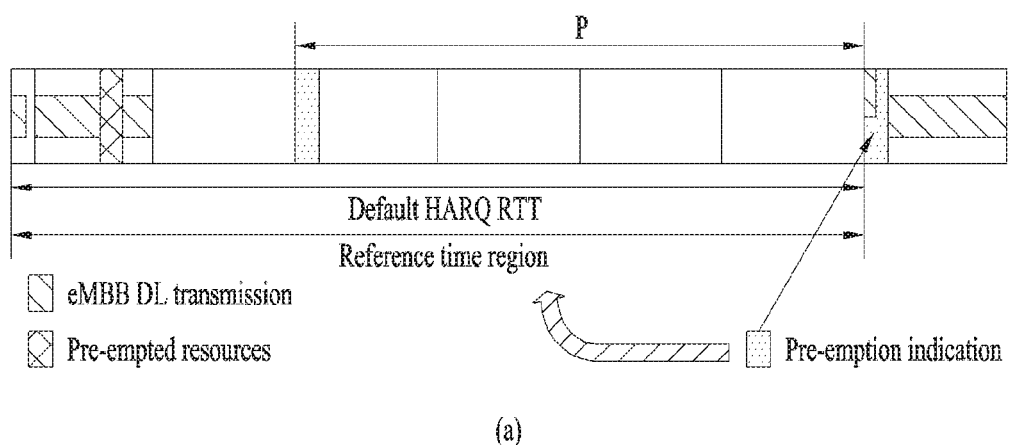
(a)
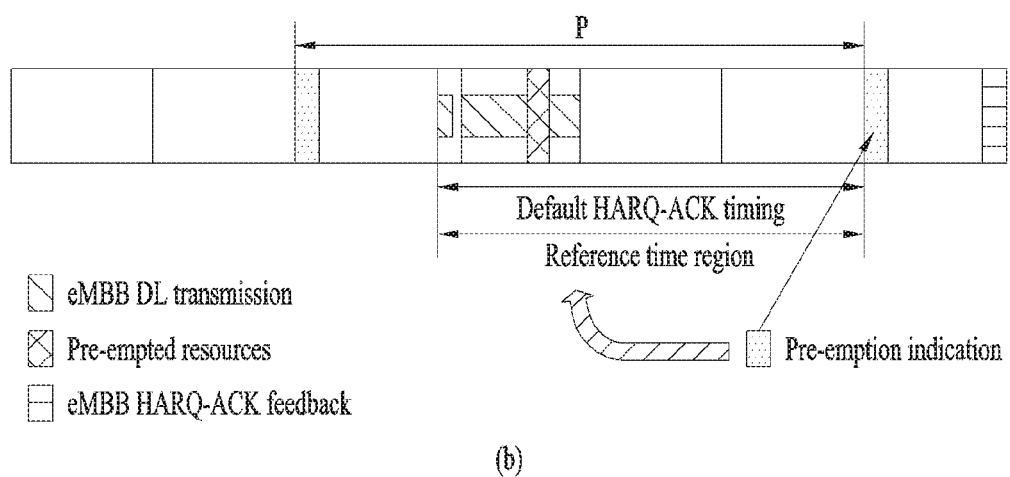
(b)

METHOD AND APPARATUS FOR INDICATING PREEMPTED RESOURCE INFORMATION

CROSS-REFERENCE TO RELATED APPLICATIONS

This application is the National Stage filing under 35 U.S.C. 371 of International Application No. PCT/KR2018/001380, filed on Feb. 1, 2018, which claims the benefit of U.S. Provisional Application No. 62/454,008, filed on Feb. 2, 2017, 62/469,454, filed on Mar. 9, 2017, 62/539,490, filed on Jul. 31, 2017, 62/555,627, filed on Sep. 7, 2017, 62/565,052, filed on Sep. 28, 2017, and 62/616,413, filed on Jan. 11, 2018, the contents of which are all hereby incorporated by reference herein in their entirety.

TECHNICAL FIELD

The present invention relates to a method for indicating pre-empted resource information and an apparatus therefor, and more particularly, to an indicating method of an indicator for a pre-empted resource to efficiently indicate the pre-empted resource, a method for setting an indication period, and an apparatus therefor.

BACKGROUND ART

As more communication devices require greater communication capacity in accordance with the trend, a next generation 5G system which is mobile broadband communication more enhanced than the conventional LTE system has been required. In the next generation 5G system referred to as NewRAT, a communication scenario is categorized into Enhanced Mobile BroadBand (eMBB)/Ultra-reliability and Low-Latency Communication (URLLC)/Massive Machine-Type Communications (mMTC).

In this case, eMBB is a next generation communication scenario having properties such as High Spectrum Efficiency, High User Experienced Data Rate, and High Peak Data Rate, and URLLC is a next generation communication scenario (e.g., V2X, Emergency Service, Remote Control) having properties such as Ultra Reliable, Ultra Low Latency, and Ultra High Availability, and mMTC is a communication scenario (e.g., IoT) having properties such as Low Cost, Low Energy, Short Packet, and Massive Connectivity.

Technical Problem

An object of the present invention is to provide a method for indicating pre-empted resource information in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

According to the embodiment of the present invention, a method for receiving a signal in a user equipment (UE) from a base station (BS) in a wireless communication system comprises the steps of configuring a plurality of durations, sometimes also referred to as intervals, of a specific time region for indicating whether a signal is transmitted, through a higher layer; receiving an indicator for indicating whether the signal is transmitted, for each of the plurality of intervals; and receiving the signal in each of the plurality of intervals in accordance with indication of the received indicator, wherein at least one of the plurality of intervals of the specific time region may have a first size, and the other intervals except the at least one interval may have a second size.

In this case, the first size and the second size may be values different from each other.

Also, the first size and the second size may be determined based on a value obtained by dividing a size of the specific time region by a number of the plurality of intervals.

Also, the first size may be $\lceil T/M \rceil$, the second size may be $\lfloor T/M \rfloor$, wherein T may be a size of the specific time region and M may be the number of the plurality of intervals.

Also, a number of at least one interval having the first size may be determined based on a value obtained by dividing the size of the specific time region by a number of the plurality of intervals.

Also, the number of at least one interval having the first size may be $T-M\lfloor T/M \rfloor$, and the number of the other intervals having the second size may be $$M - \left(T - M\left\lfloor \frac{T}{M} \right\rfloor\right),$$

wherein T may be a size of the specific time region and M may be the number of the plurality of intervals.

Also, the plurality of intervals may be configured for the specific time region and a specific frequency region.

A monitoring period of the indicator indicating whether the signal is transmitted may be associated with the size of the specific time region.

Also, the plurality of intervals may be configured if a parameter as to whether a region to which the signal is not transmitted exists is received from the higher layer.

Also, the specific time region may include a time region for receiving a downlink.

Also, the monitoring period of the indicator indicating whether the signal is transmitted may be the same as a time region where an interval for uplink transmission to the specific time region is added.

Also, the indicator indicating whether the signal is transmitted may indicate whether the signal is transmitted for a resource from a previous symbol of a first symbol of a slot at which the indicator is monitored to the time region where the interval for uplink transmission is added.

Also, the indicator indicating whether the signal is transmitted may include a plurality of bits, of each of the plurality of intervals, for indicating whether the signal is transmitted.

A UE for receiving a signal from a base station (BS) in a wireless communication system according to the present invention comprises an RF module for transmitting and receiving a signal to and from the BS; and a processor connected with the RF module, configuring a plurality of intervals of a specific time region for indicating whether the signal is transmitted, through a higher layer, receiving an indicator for indicating whether the signal is transmitted, for each of the plurality of intervals, and receiving a signal in each of the plurality of intervals in accordance with indication of the received indicator, wherein at least one of the plurality of intervals of the specific time region has a first size, and the other intervals except the at least one interval have a second size.

Advantageous Effects

According to the present invention, uplink resources between physical channels in which required transmission methods are different like eMBB and URLLC may be shared efficiently.

Also, information on a pre-empted resource region is segmented and transmitted, whereby the information on a pre-empted resource region may efficiently be indicated to a UE.

BRIEF DESCRIPTION OF THE DRAWINGS

FIG. 1 is a diagram for structures of control and user planes of radio interface protocol between a 3GPP radio access network standard-based user equipment and E-UTRAN;

FIG. 8 illustrates an embodiment of a bit field size indicating a pre-empted resource;

FIGS. 10 and 11 illustrate a time domain and an indication period indicated by an indicator for a pre-empted resource.

BEST MODE FOR CARRYING OUT THE INVENTION

Figure 2:
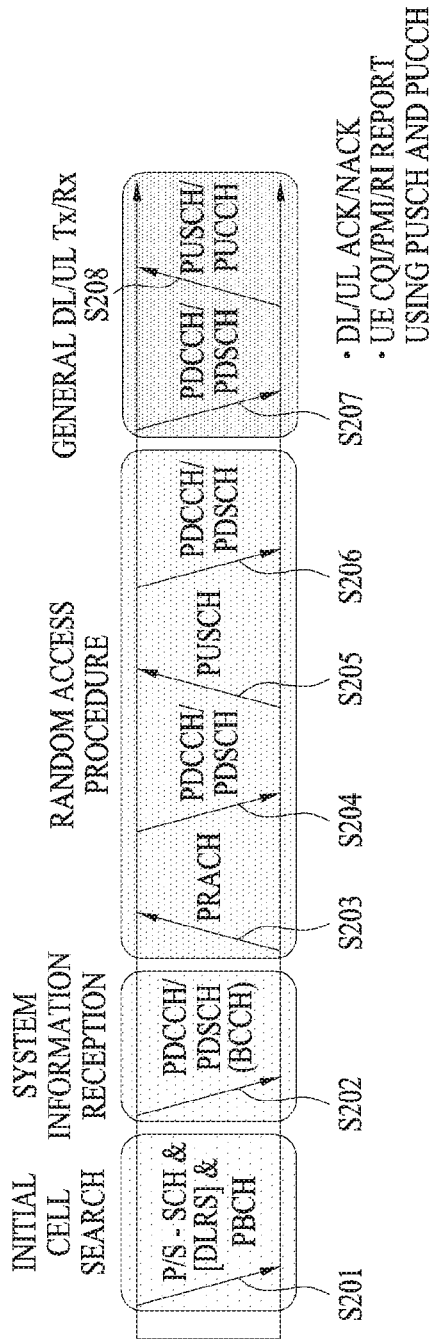
FIG. 2 is a diagram for explaining physical channels used for 3GPP system and a general signal transmission method using the physical channels.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
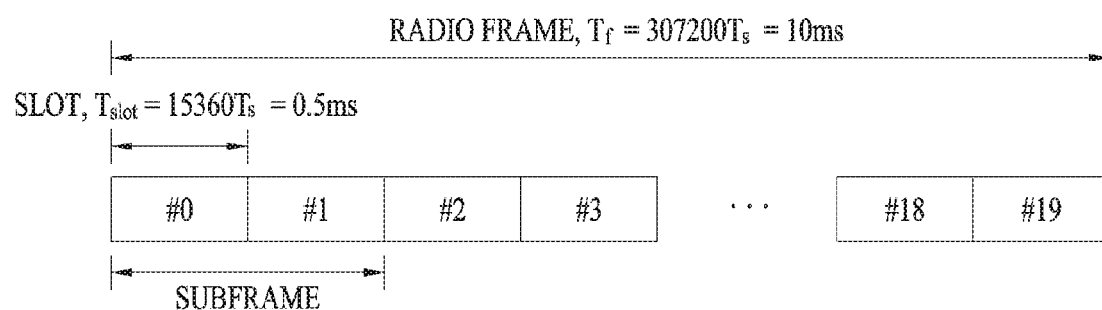
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
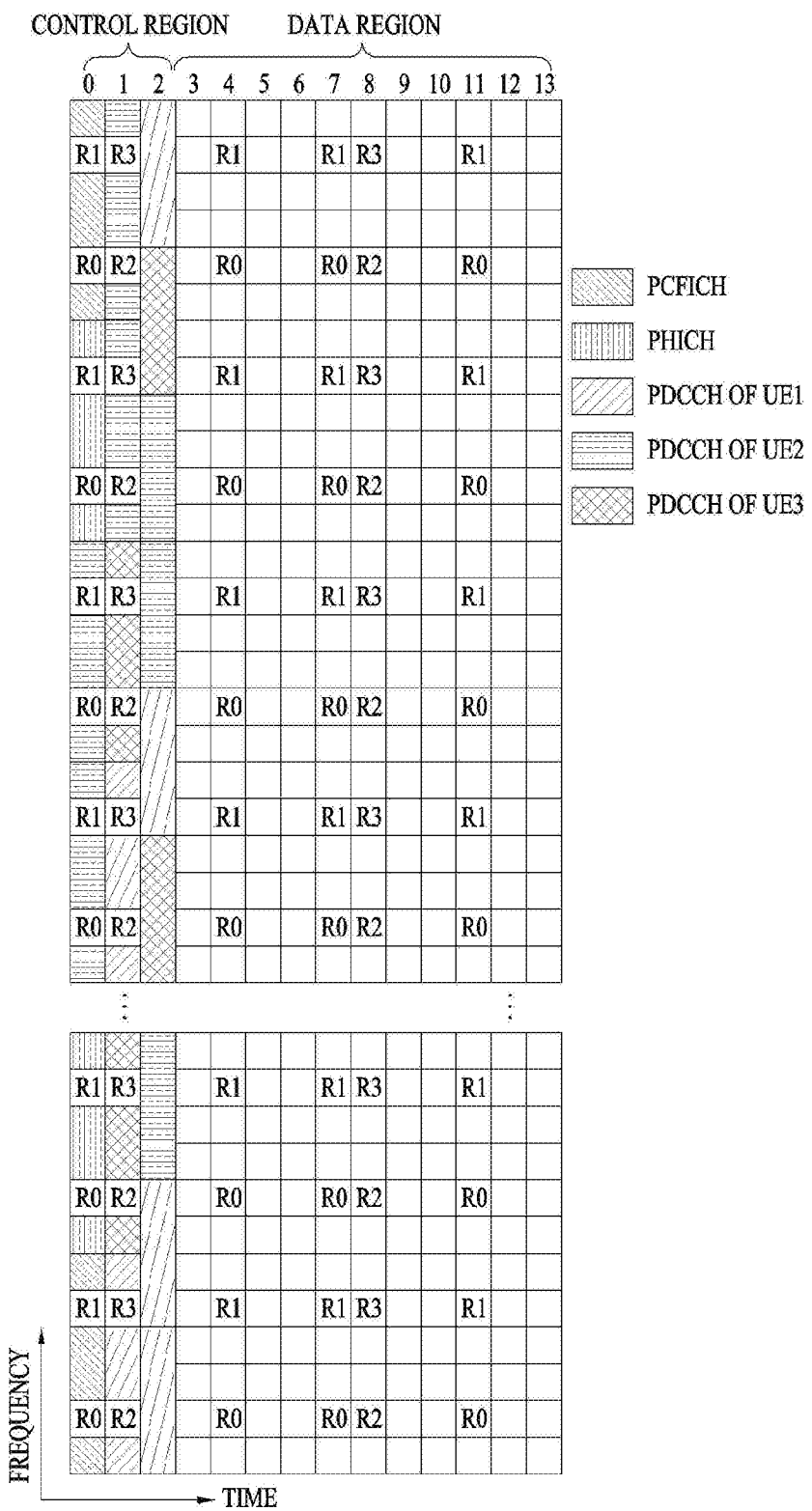
FIG. 4 illustrates a structure of a downlink radio frame in the LTE system.

FIG. 4 illustrates exemplary control channels included in a control region of a subframe in a DL radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 5:
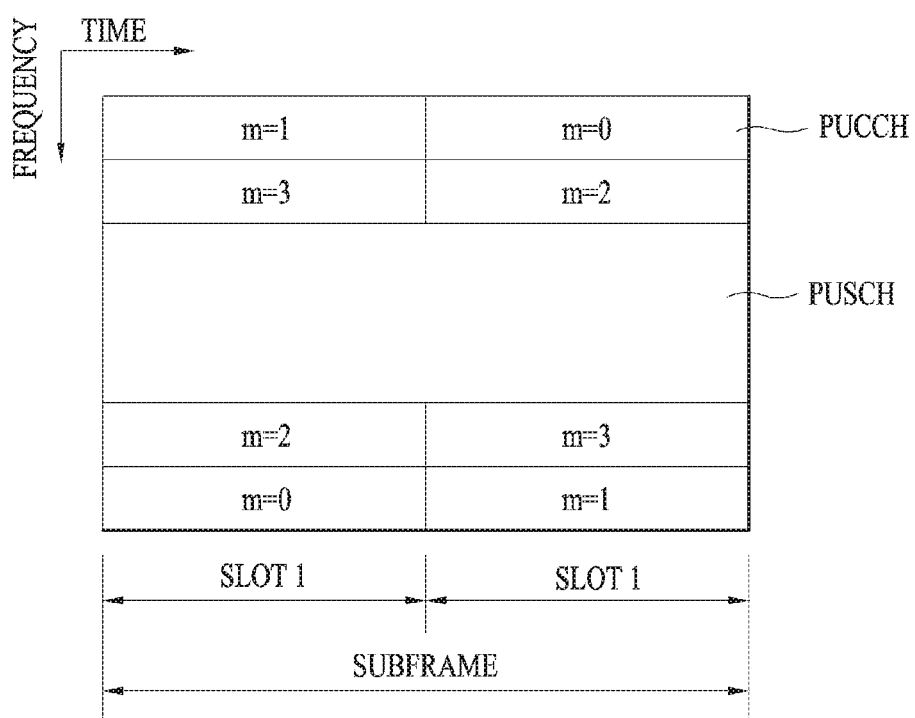
FIG. 5 illustrates a structure of an uplink subframe in the LTE system.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 6:
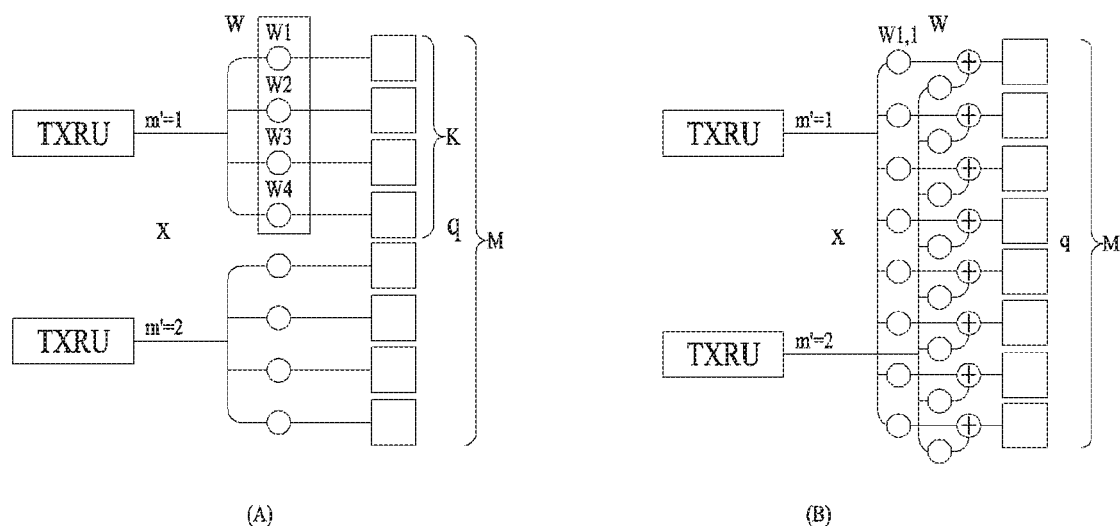
FIG. 6 illustrates examples of a connection scheme between TXRUs and antenna elements.

FIG. 6 illustrates examples of a connection scheme between TXRUs and antenna elements.

Figure 7:
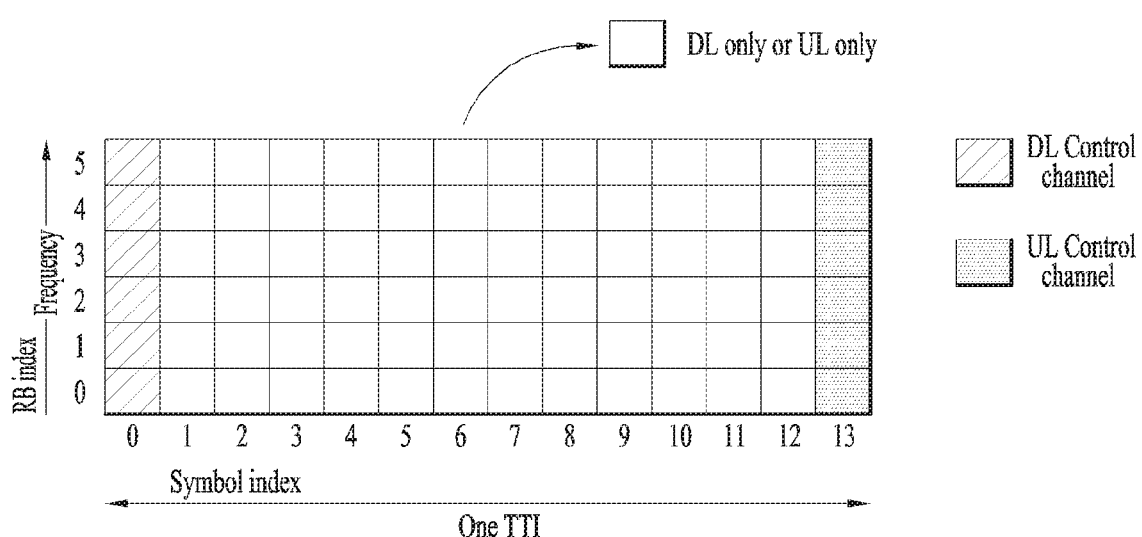
FIG. 7 illustrates an example of a self-contained subframe structure.

(a) of FIG. 6 illustrates that TXRU is connected to a sub-array. In this case, the antenna elements are connected to only one TXRU. Unlike (a) of FIG. 6, (b) of FIG. 6 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

A self-contained subframe structure shown in FIG. 7 is considered in the fifth generation NewRAT to minimize data transmission latency in a TDD system. FIG. 7 illustrates an example of a self-contained subframe structure.

In FIG. 7, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period In the fifth generation NewRAT system, various reference time units used to transmit and receive physical channels may exist in accordance with an application field or a type of traffic. The reference time may be a basic unit for scheduling a specific physical channel, and a reference time unit may be varied depending on the number of symbols constituting a corresponding scheduling unit and/or a sub-carrier spacing.

In the embodiment of the present invention, it is assumed that a reference time unit is a slot and a mini-slot for convenience of description. The slot may be a basic unit of scheduling used for general data traffic in the same manner as data transmitted from an enhanced Mobile BroadBand (eMBB). The mini-slot has a time interval smaller than a slot in a time domain, and may be a basic unit of scheduling used in traffic or communication mode for a specific purpose in the same manner as Ultra Reliable and Low Latency Communication (URLLC), non-licensed band or millimeter wave. Also, in the embodiment, which will be described later, the mini-slot may be represented by a specific symbol group including a single symbol.

However, the aforementioned description is only an embodiment for convenience of description of the present invention, and it will be apparent that the aforementioned description can be extended from the spirits of the present invention even in the case that eMBB transmits and receives physical channels based on the mini-slot or URLLC or another communication scheme transmits and receives physical channels based on slot.

In slot based transmission (hereinafter, eMBB transmission), transmission may occur for a relatively long time as compared with a relatively mini-slot based transmission (hereinafter, URLLC). In case of URLLC traffic, it is general that an urgent packet may occur suddenly, especially URLLC traffic may occur in the middle of eMBB transmission.

Meanwhile, since superposition in downlink transmission occurs in all base station ends, a method for puncturing some resources of eMBB may be used to protect URLLC data. However, since transmission entities may be different UEs in case of superposition in uplink transmission, uplink channel reception performance may be reduced remarkably due to collision between eMBB data and URLLC data unless a specific action is taken.

To solve this problem, the present invention intends to suggest a method efficiently multiplexing physical channels transmitted at their respective time units different from each other when transmission and reception are performed in a plurality of reference time units such as subframe, slot or mini-slot.

In the next generation system, time and/or frequency resources for URLLC uplink transmission may basically be configured through higher layer signaling. In detail, a resource set may be configured independently depending on whether an uplink transmission scheme is grant-based UL transmission or grant-free UL transmission. If the resource set is configured independently as above and eMBB transmission and URLLC transmission collide with each other, it may be useful that eMBB transmission and URLLC transmission may be processed in their respective methods different from each other. Meanwhile, in this case, grant-free UL transmission may mean that the UE selects a specific resource among resources allocated previously or from a higher layer and performs uplink transmission for the selected specific resource without scheduling indication of the base station.

Meanwhile, although the embodiment of the present invention has been described based on an uplink channel and signal, the embodiment of the present invention is not limited to the uplink channel and signal and may be applied to a downlink channel and signal.

<Halting On-Going Transmission of eMBB>

If eMBB uplink transmission and URLLC transmission are subjected to superposition, detection performance of two channels may be reduced rapidly due to mutual interference. Particularly, in case of URLLC, substantial latency may be longer due to detection failure. As a method for solving this problem, transmission of eMBB uplink channel which is previously being transmitted may be halted only at the time when URLLC uplink channel is transmitted or transmission from the time when URLLC uplink channel is transmitted may be halted. To this end, the eMBB UE may need to recognize the presence of the URLLC uplink channel in the middle of transmission.

Therefore, the present invention intends to suggest an embodiment of a method for recognizing the presence of URLLC uplink channel through eMBB UE and halting eMBB transmission, as follows.

Embodiment 1-1

It is considered that the eMBB UE detects uplink grant for URLCC, DCI for control and/or a DMRS for uplink channel For the above scheme, the base station may signal information for detecting URLLC signal, UE-specifically. In detail, the information for detecting URLLC signal may be candidates of DCI and/or DMRS.

Meanwhile, instead of UE-specifically configuring DCI and/or DMRS for URLLC, the DCI and/or DMRS for URLLC may be configured cell-specifically, beam-specifically or UE-group commonly.

However, if numerologies between eMBB and URLLC are different from each other, it may not be suitable that DCI and/or DMRS for URLLC is configured cell-specifically, beam-specifically or UE-group commonly. In this case, the base station may transmit information on a halting signal in accordance with eMBB numerology. That is, the eMBB UE may detect information on a halting signal from the base station and, after a certain time, may halt eMBB transmission at only a corresponding time or after the corresponding time. For example, URLLC performs grant based uplink transmission, the eMBB UE may detect information on a transmission time of URLLC uplink signal from the base station and, and may halt eMBB transmission at only a corresponding time or after the corresponding time.

However, according to the aforementioned example, an operation may be difficult if URLLC performs grant-free UL transmission. Therefore, a resource for grant-free UL transmission may be reserved. In other words, the resource for grant-free UL transmission of URLLC may not be used by eMBB uplink.

Embodiment 1-2

The eMBB UE may take an LBT (listen before talk) scheme for URLLC signal. That is, the eMBB UE may measure whether the URLLC signal is transmitted from another UE by means of a method such as energy detection during eMBB uplink transmission, and may halt eMBB signal transmission based on the measurement.

However, in the aforementioned case, if a distance between the two UEs is distant, that is, if a hidden-node problem occurs, the aforementioned operation may not be performed normally.

Therefore, if eMBB signal transmission halting for taking the LBT scheme is not performed normally, that is, as the distance between the two UEs is distant at a certain distance or more, although eMBB uplink transmission has been performed, if a problem such as interference caused by eMBB uplink transmission occurs, returning to the embodiment 1, a signal for URLLC signal transmission may be received from the base station. At this time, if the base station discovers interference caused by URLLC uplink transmission and uplink transmission of the eMBB UE in the middle of performing the corresponding operation by assuming that uplink transmission is performed based on LBT, the base station may indicate, to the UE, to halt eMBB uplink transmission based on the LBT scheme and perform the operation according to the embodiment 1.

Meanwhile, a control channel monitoring behaviour performed while the URLLC signal of the UE multi-slot scheduled or multi-mini-slot scheduled is being transmitted and received may be as follows.

(1) If control channel monitoring is configured to be performed per slot, control channel monitoring is performed per slot. Suspension/drop/continue indication for multi-slot scheduling which is ongoing may be designated through a control channel This indication content or type may be notified using RNTI, CRC, scrambling, DMRS sequence or scrambling differently. Otherwise, transmission search space candidates or resources may be configured differently to identify operations such as suspension/drop/continue. That is, if suspension or drop of multi-slot scheduling is indicated, control channel monitoring may be suspended or dropped after control channel monitoring indicated by suspension or drop within a corresponding interval, and if indication is continuously designated, control channel monitoring is maintained per slot, whereby multi-slot scheduling may be indicated continuously.

(2) In case of multi-slot scheduling, the control channel monitoring operation in the middle of transmitting and receiving URLLC signal may be skipped. That is, the control channel monitoring operation may be halted in the middle of transmitting and receiving the URLLC signal.

Meanwhile, an indication signal for puncturing or uplink transmission halting, which is transmitted from the base station to the UE, may be transmitted per mini-slot or mini-slot group or URLLC TTI indicated separately through higher layer signalling. For example, if eMBB and URLLC, which have their respective service requests and/or scheduling units different from each other, are operated based on a grant of the base station, the base station may transmit the indication signal for puncturing or uplink transmission halting to the eMBB UE in the middle of transmitting eMBB uplink to receive URLLC uplink transmission through time and frequency resources partially superposed on eMBB uplink transmission region.

At this time, the indication signal may be transmitted at the time when a grant signal for URLLC uplink transmission is transmitted or from the time when the grant signal is transmitted to the time before URLLC uplink transmission is performed. The eMBB UE may delay or halt eMBB uplink transmission from a specific time (for example, next mini-slot (group)) after the indicated signal transmitted from the base station is received/detected. At this time, the specific time may correspond to a mini-slot or mini-slot group after the indication signal is received/detected. Meanwhile, the embodiment of the indication signal may be extended/applied to downlink transmission in addition to uplink transmission for eMBB/URRLC.

In the next generation system, in respect of eMBB and URLLC having their respective service requests and/or scheduling units different from each other, downlink resources may partially be used as URLLC downlink transmission while eMBB downlink transmission is being performed. Also, in order that the eMBB UE performs suitable demodulation and decoding, indication signalling for a part of downlink resources used for URLLC downlink transmission may be transmitted.

Also, when the indication signalling is transmitted per mini-slot or mini-slot group, the indication signalling may include (1) information as to whether eMBB downlink transmission which is ongoing has been punctured by URLLC downlink transmission and punctured resource information. Also, the indication signalling may include (2) information as to whether eMBB uplink transmission which is ongoing has been delayed/halted by URLLC uplink transmission, and may include resource information used for URLLC uplink transmission.

Meanwhile, the indication signalling may indicate (1) a resource region not information for a UE for demodulating and decoding downlink data. Also, the indication signalling may include (2) information as to when uplink transmission is delayed or halted or target resource information. The information may briefly be configured in the form of a bitmap of 2 bits. MSB (Most Significant Bit) may be information on downlink, and LSB (Least Significant Bit) may be information on uplink. Alternatively, the indication signal may be configured in the form of mapping information on downlink/uplink multiplexing of eMBB/URLLC into another sequence.

Meanwhile, if grant-free based uplink transmission is considered, it may be inefficient that the base station end controls a scheme of on-going transmission. For example, if URLLC performs grant-free based uplink transmission and traffic for URLLC occurs intermittently, the base station end cannot know when eMBB uplink transmission is halted. To solve this problem, it may be considered that a resource of a target for the transmission delay or the transmission halting is previously configured through higher layer signalling.

<Superposition of eMBB and URLLC>

It may be considered that eMBB and URLLC are simultaneously transmitted from the same resource. A power ratio between two uplink channels may be configured at a certain level or more, and eMBB signal and URLLC signal may be subjected to superposition, whereby the base station end may detect two uplink channels through an interference cancellation scheme.

Basically, the eMBB uplink may be being transmitted, and considering QAM modulation, it is favourable that a power is maintained in the middle of transmitting the eMBB uplink channel, whereby the power of URLLC may be changed suitably. Meanwhile, in accordance with the status or power configuration of the eMBB UE, the transmission power of the URLLC signal may be configured to be smaller than the transmission power of the eMBB uplink signal, or vice versa. In other words, the transmission power of the URLLC signal may be scaled based on the transmission power of the eMBB signal. At this time, it is required that a signal having a relatively great transmission power should first be detected.

At this time, considering a latency aspect, a network may allow only that eMBB signal of a relatively low transmission and reception power is superposed on URLLC uplink signal of a relatively high transmission and reception power. In this case, the URLLC signal should be cancelled fully or at a certain level or more to decode the eMBB signal. To this end, information on the URLLC signal may be notified to the eMBB UE UE-specifically, cell-commonly, or UE group-specifically.

At this time, the aforementioned method may be limited to downlink transmission. If the aforementioned method is applied to uplink transmission, the aforementioned method may be limited to the case that uplink transmission occurs for the same network. This is because that the network should know both of demodulation information and decoding information on eMBB and URLLC uplink transmission to perform demodulation and decoding for uplink transmission.

At this time, candidates for information on URLLC signal decoding may previously be defined, or may be indicated to the UE by the network through signaling. Furthermore, indication through network signaling may be performed by a higher layer, or may be performed by selecting a specific candidate through DCI after candidates are configured by the higher layer. The DCI may be group common DCI or DCI for scheduling eMBB data.

Meanwhile, the URLLC signal may have a relatively high power, and thus may perform decoding regardless of the presence of the eMBB signal. If superposition of an opposite direction is considered, that is, if URLLC of a relatively low transmission and reception power is superposed on eMBB signal of a high transmission and reception power, description position of the eMBB signal and the URLLC signal in the above embodiment may be changed. At this time, if information on the eMBB signal is provided to URLLC UE, information on a specific code block group may be provided.

Meanwhile, grant based scheduling may be considered for eMBB uplink channel, and both grant based scheduling and grant-free based scheduling may be considered for URLLC uplink channel. Particularly, superposition between the URLLC signal and the eMBB signal may be configured through power control, that is, TPC (Transmission power control) between grant based uplink channel transmissions.

For example, TPC and/or offset higher layer signaled may be set to a suitable value. However, if TPC value or offset range has a great control width and a superposition operation is configured by a higher layer, a range of the TPC value and/or a range of the offset value higher layer signaled may be changed.

Meanwhile, a resource to which eMBB and URLLC may be transmitted by being subjected to superposition may be configured semi-statically, and URLLC scheduling within the corresponding resource may be performed dynamically based on grant. At this time, the eMBB UE may individually apply a transmission power to a resource to which URLLC may be transmitted and a resource to which URLLC is not transmitted, and TPC information applied to the resource to which URLLC may be transmitted may be received through higher layer signaling.

At this time, it may be considered that different resources having different power configurations are configured for single uplink transmission. For example, a relatively low uplink transmission power may be configured for a resource considering superposition or a guaranteed resource for URLLC transmission, as compared with the other resources.

Also, phase continuity may not be ensured during power change. Therefore, a separate pilot or reference signal may be added even for the guaranteed resource.

Next, a detailed embodiment of a UE operation method in the guaranteed resource will be described. Particularly, a method for transmitting eMBB uplink will be described.

Embodiment 2-1

Transmission may not be performed except eMBB signal or reference signal, and a specific signal such as UCI. That is, for URLLC transmission, eMBB uplink transmission may be punctured or rate matched in a corresponding resource.

Embodiment 2-2

A low eMBB transmission power may be configured except eMBB signal or reference signal, and a specific signal such as UCI. In detail, a transmission power or power density for a guaranteed resource may be configured by additional offset in proportion to a transmission power in a non-guaranteed resource, and independent power control may be performed. In this case, independent power control may mean that higher layer signaled offset configuration and/or TPC may be controlled independently.

Embodiment 2-3

Application of OCC (orthogonal cover code) to a frequency and/or time domain may be considered. For example, OCC of a 2 length or OCC of a 4 length may be applied to a specific PRB set (for example, single PRB) on a frequency axis, and multiplexing between eMBB and URLLC, which have their respective service requests and/or scheduling units different from each other, may be supported based on the OCC.

For example, the eMBB signal and the URLLC signal may repeatedly be mapped for the even numbered subcarrier and the odd numbered subcarrier per PRB and OCC may be configured for each of the subcarriers. In detail, a coded symbol corresponding to the even numbered subcarrier index may be multiplied by +1, and a coded symbol corresponding to the odd numbered subcarrier index may be multiplied by −1 or +1 in accordance with service or UE.

Alternatively, the eMBB signal and the URLLC signal may repeatedly be mapped into first six subcarrier indexes and next six subcarrier indexes within each PRB, and OCC may be configured for each of the subcarrier indexes.

In the schemes of the aforementioned embodiments 2-1 to 2-3, a specific scheme may be selected and applied, and the base station may configure the specific scheme through DCI or higher layer signaling. At this time, the DCI may be DCI for scheduling corresponding uplink transmission. Also, URLLC which becomes a target of multiplexing is not limited to grant based uplink transmission, and may be extensively applied to grant-free based uplink transmission.

Meanwhile, in case of a grant-free based uplink channel, a power control at the base station end may be restrictive, and in this case, superposition between eMBB data and URLLC data may not be supported. In the above case, the eMBB data may be rate matched or punctured for the resource configured for grant-free based URLLC. Also, the resource configured for the URLCC may be comprised of all of candidates for which grant-free uplink transmission may be performed, or the eMBB may be indicated by the base station through higher layer signaling or DCI in the form of a separately guaranteed resource.

On the other hand, if superposition between the eMBB signal and the URLLC signal is supported, a power may be configured at the base station end on the basis of higher layer signaled offset. In detail, TPC for a grant-free mode may be configured through a separate channel such as group common DCI or UE-specific DCI. At this time, a TPC command may not be for accumulation but be power configuration for a first grant-free transmission resource after the TPC command is transmitted. Otherwise, a power for various grant-free transmission resources may be configured through a TPC command, and a grant-free transmission resource, which will be applied, may be configured through a higher layer, or may be indicated dynamically through DCI. Meanwhile, a value transmitted through TPC may be an offset value or a power control parameter such as PO or alpha, and the corresponding parameter may be configured based on pathloss measured by the UE to calculate a power.

Meanwhile, if URLLC and eMBB are subjected to superposition, the eMBB UE may perform rate matching by emptying a corresponding resource element without transmitting a signal from a resource element to which DMRS of URLLC may be transmitted. Otherwise, a sequence (for example, reference signal) orthogonal to URLLC DMRS may be transmitted from a resource element to which DMRS of URLLC is transmitted. Channel estimation of URLLC may stably be performed even in the case that superposition occurs through the aforementioned methods. If URLLC is first decoded and then eMBB is decoded, URLLC signal may be transmitted from the resource element to which DMRS of eMBB is transmitted. This is because that decoding of the eMBB signal may be attempted after the URLLC signal is removed if URLLC is successfully decoded, and reliability of URLLC is generally higher than that of eMBB.

Meanwhile, the URLLC UE may be allowed to detect uplink grant of the eMBB UE or a UE which uses a grant-free mode may be allowed to detect uplink grant for the URLLC signal. At this time, in order that the URLLC UE is allowed to detect uplink grant of the eMBB the UE which uses a grant-free mode is allowed to detect uplink grant for the URLLC signal, masking is performed with group RNTI instead of RNTI per UE, whereby UE ID may be transmitted through payload. At this time, UE ID may be ID of a UE which performs grant based uplink transmission or UD of the eMBB UE. If DCI of two stages is used, the first DCI may be masked with group RNTI to first indicate information on resource allocation, and the second DCI may be masked with RNTI per UE to indicate information on resource allocation.

If the aforementioned DCI is received by the UE of the grant-free mode, the UE may perform an operation for enhancing reliability by sensing that grant-free uplink transmission may collide with grant based transmission during grant-free uplink transmission and dropping transmission, or greatly increasing power offset of grant-free uplink transmission.

Also, to avoid collision with a grant based UE, a frequency domain of a grant-free transmission resource may be changed dynamically. For example, a system bandwidth is divided into M subbands and a subband to which a grant-free resource may be allocated may be notified dynamically.

Meanwhile, collision may occur even between grant-free uplink transmissions. In this case, if an uplink channel is mapped for a full resource for grant-free uplink transmission or a resource reserved for grant-free uplink transmission, OCC may be applied. In detail, grant-free uplink transmission transmitted from a resource for grant-free uplink transmission, that is, a resource guaranteed for grant-free uplink transmission may repeatedly be mapped into a corresponding coded symbol or OCC may be applied for the coded symbol.

For example, supposing that OCC o0, o1, o2, ..., oM−1 are used for subcarrier indexes f0, f1, ..., fN−1, coded symbols c0, c1, c2, ... may be mapped in a guaranteed resource in a way such as c0*o0, c0*o1, ..., c0* oM−1, c .... The above OCC application method is only exemplary, and an actual mapping order may be interleaved. At this time, OCC sequences may be selected differently for different UEs, and grant-free uplink transmission for UEs which use different OCCs may be divided and identified at the base station end. Generally, the traffic amount of URLLC may be relatively smaller than other data traffic, and thus resource increase according to OCC application may be insignificant.

<URLLC Repetition>

In the next generation system, URLLC may perform repeated transmission as a part of a method for achieving requirements of reliability acquisition. Considering that URLLC service is changed at a long time interval, URLLC transmission repetition times for a single channel may be configured through higher layer signaling. Alternatively, as the amount of URLLC traffic is changed, to reflect this, DCI may additionally indicate information on URLLC repetition transmission. That is, URLLC repetition transmission based on configuration through a higher layer or DCI may be configured by the base station by properly considering an influence of eMBB and URLCC.

As another method, URLLC signal may be repeated until ACK for a specific channel is received. For example, an uplink channel may be repeatedly transmitted until a corresponding ACK is received. In detail, after ACK is received, considering the time when ACK is detected, repetition transmission for an uplink channel may be halted after a certain time from the time when ACK is received. In addition, repetition transmission may be halted from next symbol, next mini-slot or next URLLC TTI from the time when ACK is received. Alternatively, the time when actual repetition transmission is halted may be configured depending on UE capability/higher layer signaled offset/L1 indication such as DCI or ACK channel.

However, if the time when ACK is received is delayed, the repetition transmission times may be increased excessively, and throughput degradation of eMBB may be caused unnecessarily. In case of grant-free based transmission, collision between uplink transmissions may occur more frequently. To reduce such collision, it may be considered that repetition transmission is halted even in the case that NACK is received, and retransmission may newly be performed in accordance with new scheduling information in the corresponding case. At this time, the retransmission may be performed repeatedly in accordance with higher layer signaling and/or indication of DCI.

On the other hand, maximum transmission repetition times may be configured. Repetition transmission may be performed so as not to exceed the corresponding maximum transmission repetition times even before ACK or NACK is actually received. At this time, if there is a blank resource or invalid resource within the corresponding interval, URLLC transmission may be delayed, or actual transmission may not be performed although included in the repetition transmission times.

Meanwhile, if a slot type is indicated dynamically through a common signal, a grant-free transmission resource may dynamically be valid or not. For example, if a slot comprised of a contention-free resource is configured as a downlink centric slot or a downlink dedicated slot, uplink repetition transmission may be delayed, or actual transmission may not be performed although included in the repetition transmission times. Additionally, if grant-free transmission resources are configured continuously, it may be assumed that repetition transmission occurs continuously.

Meanwhile, embodiments in which the network may identify initial transmission and retransmission from each other are as follows.

(1) Grant-free transmission resources for initial transmission and retransmission, that is, grant-free frequency/time/ code resources may be configured differently. In detail, grant-free transmission resources may be configured differently even in accordance with a retransmission order. For example, in case of the Nth retransmission, resources may be configured differently from the other retransmission, or grant-free transmission resources may be configured differently per retransmission order or group based on the order.

The above resources may be configured separately by a higher layer, or may be changed depending on a specific pattern within a resource configured for URLLC uplink. Meanwhile, if collision between URLLC transmission and eMBB transmission occurs in initial transmission, collision should not occur during retransmission. To this end, a hopping pattern may be configured differently through UE-specific parameter or UE-RNTI.

(2) DMRS patterns used for initial transmission and retransmission may be configured differently from each other. That is, different DMRS patterns may be rate matched, whereby initial transmission and retransmission may be identified from each other during DMRS detection. In detail, the DMRS patterns may be configured differently even in accordance with a retransmission order. For example, in case of the Nth retransmission, resources may be configured differently from the other retransmission, or the DMRS patterns may be configured differently per retransmission order or group based on the order.

(3) UCI including Redundancy Value (RV), New Data Indicator (NDI), etc. is transmitted together with data at a grant-free transmission resource. In detail, a resource for UCI of a grant-free uplink resource may be configured separately through higher layer signaling, or may be transmitted from a resource previously fixed within the grant-free transmission resource. At this time, the previously fixed resource may be a resource having the lowest frequency index or the highest frequency index, or may be a specific frequency index set.

(4) RVs used for initial transmission and retransmission may be configured differently from each other. The base station may determine initial transmission through a decoding metric through blind detection for RV.

The followings may be considered for power configuration for URLLC uplink transmission.

(1) Power ramping may be performed within a repetition transmission interval. In this case, the number of repetition transmission times may be reduced. For example, a specific basic unit for power ramping in a repetition transmission interval may be configured, and this configuration may be indicated through a higher layer.

(2) Power may be maintained uniformly within the repetition transmission interval. In this case, unnecessary power consumption may be avoided.

(3) Power ramping may be performed during grant-free based retransmission. Since it may be difficult to perform dynamic power control through DCI, the power may be increased based on retransmission.

(4) The power within the repetition transmission interval may be changed in accordance with a specific pattern. The pattern may previously be designated through UE-ID, or the base station may indicate the pattern through higher layer signaling and/or DCI.

For example, if a power difference is different in accordance with a repetition transmission order between grant-free uplink transmissions colliding in the same resource set, it may be favourable for superposition.

In detail, it is assumed that a power value of a first uplink transmission is great in a specific resource and a power value of a second uplink transmission is great in another specific resource. At this time, the base station may perform detection for the first uplink transmission having a relatively strong received power in a specific resource, and then may attempt detection of the second uplink transmission through SIC, etc.

Meanwhile, in the other resource, superposition between the second uplink transmission and the first uplink transmission may be separation-detected efficiently using the detection information. Also, in the same manner as the grant-free based uplink transmission, the aforementioned method may be useful for the status that a power cannot be changed variably.

In detail, power configuration within the repetition transmission interval may include 0. This may mean TDM and/or FDM between DMRS and/or between data. At this time, the DMRS may be subjected to CDM between different UEs, and the data may only be subjected to TDM or FDM. In this case, the expression that the DMRS are subjected to CDM between different UEs means that a power for the DMRS is not 0.

<Signaling Scheme for Indicating Impacted Resource>

In the next generation system, data traffics having their respective service requirements and/or scheduling units different from each other, for example, data traffics of eMBB and URLLC may be scheduled on the same resource, and a specific data traffic may be impacted by another data traffic in the corresponding case. For example, a part of data traffic of the eMBB may be corrupted by URLLC data traffic, or a part of a resource into which data traffic of the eMBB is mapped may be punctured. Also, transmission of eMBB data may be delayed or halted. The resource impacted as above may be referred to as an impacted resource, and the base station may transmit an indication signal for indicating the impacted resource to the UE. By using the indication signal, the UE may delete a corrupted coded symbol from a buffer or perform a task for not using the corrupted coded symbol for decoding with respect to downlink reception, and may blank a specific resource or delay or halt transmission with respect to uplink transmission.

The indication signal may include both information on an impacted resource of a downlink and information on an impacted resource of an uplink. Alternatively, an indication signal of the information on an impacted resource of a downlink and an indication signal of the information on an impacted resource of an uplink may be transmitted separately.

Contents and the amount of contents may be varied depending on a position to which the indication signal is transmitted. For example, if the indication signal may be transmitted per mini-slot or mini-slot group or in a scheduling unit for URLLC, contents may include small bits of 1 bit or 2 bits, which may indicate whether the impacted resource exists. In this case, the indication signal may indicate a state through a sequence, like PCFICH or SRS, or may indicate the state as a modulation symbol, like PHICH or PUCCH.

At this time, a physical channel to which the indication signal is transmitted may follow only a transport format for PCFICH, PHICH, etc., and the indication signal is transmitted from the position to which the corresponding physical channel is actually transmitted, wherein the indication signal may be allocated to a position of a resource, to which a specific PHICH group is transmitted, and/or PHICH sequence or OCC index. Although the base station transmits the indication signal, a transport format of the indication signal may be based on SRS transport or PUCCH transport format.

The indication signal may include more detailed information on an impacted resource, such as time/frequency resource information or code block/code block group information in which the impacted resource is included, or may perform encoding and/or CRC attachment for the information on the impacted resource per a plurality of mini-slots/mini slot groups, scheduling unit for URLLC, and code block/code block group. In this case, as a physical channel that may transmit the indication signal, a PDCCH or a PUCCH may be used. At this time, the physical channel that may transmit the indication signal means a type of a channel to which the indication signal is transmitted, and the base station may transmit the indication signal at a specific time on the basis of uplink transmission in addition to a downlink signal. That is, if the base station transmits the indication signal to the UE, this corresponds to downlink transmission but means that the indication signal may be transmitted based on a transport format of PUCCH.

A detailed embodiment of a method for expressing an impacted resource for a plurality of mini-slots/mini slot groups will be described.

Embodiment 3-1

The presence of an impacted resource may be expressed in the form of a bitmap per a plurality of mini-slots/mini slot groups, scheduling unit for URLLC, and code block/code block group.

If the presence of an impacted resource is expressed in the form of a bitmap with respect to all resources, and if the amount of traffic for URLLC is great, signaling overhead may be increased unnecessarily. Therefore, when an impacted resource for uplink is expressed together with an impacted resource for a downlink, information on impacted resources of downlink/uplink may be expressed in the form of bitmap per the aforementioned unit. In other words, the presence of an impacted resource for each of a plurality of mini-slots/mini slot groups, scheduling unit for URLLC, or code block/code block group may be expressed in the form of a bitmap.

Embodiment 3-2

The presence of an impacted resource for a plurality of mini-slots/mini slot group, scheduling unit for URLLC, or code block/code block group may be expressed in the form of a specific pattern. If the amount of URLLC traffic is small, a portion impacted by URLLC transmission during eMBB transmission of a great scheduling unit may be limited to several mini-slots/mini slot groups. Therefore, the information on an impacted resource may be expressed as being limited to a specific pattern set. For example, if the number of mini-slots/mini-slot groups is 7 within eMBB TTI, examples of possible patterns include [1 0 0 0 0 0 0], [0 1 0 0 0 0 0], . . . , [0 0 0 0 0 0 1], . . . , [1 1 1 1 1 1 1].

Another method may indicate a start point where an impacted resource is generated and an end point. If repetition transmission is introduced for URLLC of a small scheduling unit, the above indication values may express a start point of the impacted resource, and the actual impacted resource may be expressed as a corresponding start point and repetition number.

In detail, considering network flexibility, the pattern, a scheme of a pattern which is indicated, number of cases for a pattern combination may be configured by a higher layer. If an impacted resource of an uplink is expressed together with an impacted resource for a downlink, a value expressed in each pattern may be replaced with the information on an impacted resource in a downlink and/or an uplink.

At this time, whether a time domain resource is expressed in the form of bitmap or pattern may be indicated by the base station through higher layer signaling, DCI and/or group common PDCCH.

In the aforementioned embodiment, if a pre-empted resource is indicated by combination of specific patterns, retransmission of URLLC signal corresponding to the pre-empted resource may be scheduled together with the pre-empted resource. In this case, the pre-empted resource by retransmission may be indicated.

For example, when a pre-empted resource is indicated, a pre-empted resource corresponding to initial transmission may be indicated, and a pre-empted resource corresponding to retransmission after a specific time from the time when corresponding initial transmission occurs may additionally be indicated. At this time, the specific time corresponding to retransmission may be a fixed value or a value configured semi-statically.

The resource corresponding to retransmission may always be indicated in the form of a resource set when a pre-empted resource for initial transmission occurs, or when the pre-empted resource is indicated, as a 1-bit flag exists in an indicator for the pre-empted resource, whether to indicate only a pre-empted resource for initial transmission or whether to indicate all of the pre-empted resources for initial transmission and retransmission may be configured. Otherwise, a pattern for retransmission may additionally be indicated.

In this case, when a 1-bit flag is used, if the indicator for the pre-empted resource includes information on a slot of the pre-empted resource, a field indicating information on a slot and a field indicating the pre-empted resource may be configured in combination. For example, when HARQ RTT includes 4 symbol groups, the pattern may be enlarged as follows.

[1 0 0 0 0 0 0], [0 1 0 0 0 0 0], . . . , [0 0 0 0 0 0 1], . . . , [1 1 1 1 1 1 1], [1 0 0 0 1 0 0], [0 1 0 0 0 1 0], [0 0 10 0 0 1], [0 0 0 1 0 0 0|1], . . . , [0 0 0 0 0 0 1|0 0 0 1], [1 1 1 1 1 1 1|1 1 1 1].

That is, if the pre-empted resource corresponding to retransmission is indicated, the information on a pre-empted resource may be enlarged to information on a plurality of slots.

As another embodiment, as the information on a pre-empted resource, a starting slot index at which a pre-empted resource within a specific interval first occurs may be indicated, and a plurality of slot intervals from the corresponding slot or a symbol group where the pre-empted resource within the specific interval occurs may be indicated. In detail, the specific interval may be two slots, and thus the information on the pre-empted resource may indicate the pre-empted resource through a bitmap or pattern indication for symbol groups within a plurality of slots and a slot index. The plurality of slot intervals and/or the specific interval may be indicated by the base station through higher layer signaling and/or DCI. Otherwise, the plurality of slot intervals and/or the specific interval may previously be defined.

As another method, as the information on the pre-empted resource, a starting symbol index at which the pre-empted resource within the specific interval first occurs may be indicated, and the pre-empted resource which may occur within the specific interval from the symbol group index corresponding to the starting symbol index may be indicated.

In the aforementioned embodiment, initial transmission is only exemplary, and a transmission period of an indicator for the pre-empted resource may be configured by a plurality of slots, and position indication for initial transmission of the aforementioned embodiment may be replaced with a position for the pre-empted resource first generated within the corresponding slot.

That is, the embodiment may extensively be applied even in case of the pre-empted resource for retransmission in such a manner that the indicator for the pre-empted resource for retransmission may be indicated by a method for indicating the pre-empted resource for initial transmission, and then the pre-empted resource for retransmission may be indicated by the method for indicating the pre-empted resource for retransmission in the aforementioned embodiment.

Meanwhile, when the pre-empted resource is indicated, the pre-empted resource may be indicated once over a plurality of slots. This may be useful when the indicator for the pre-empted resource is transmitted at a specific period. Simply, the pre-empted resource may be indicated in the form of bitmap with respect to a specific area. At this time, the specific area indicated in the form of bitmap may be designated separately by the base station or may be configured equally to the transmission period of the indicator for the pre-empted resource. This will be described later in detail. Meanwhile, the specific area indicated in the form of bitmap may be defined in the form of combination of a time domain corresponding to the specific interval and a specific frequency domain.

According to the aforementioned embodiment, when the specific area is configured greatly at a certain area or more, if the grate specific area is indicated in the form of bitmap, excessive signaling overhead of the indicator may be generated.

To solve this, it may be considered that the specific area is indicated in the form of pattern. URLLC traffic corresponding to the pre-empted resource may not occur frequently, and thus a maximum number of times at which the pre-empted resource is generated may be restrictive within the specific interval. Therefore, the pattern for the specific area may include a pattern for a case that the pre-empted resource is generated only once within the specific area based on a basic unit of the pre-empted resource, which is designated based on indicated time-domain granularity. Similarly, the pattern for the specific area may include a pattern for a case that the pre-empted resource is generated within the specific area as much as N times. At this time, a value of N may be 1 to 3, or may be a value previously determined like a size of the specific area or may be indicated by the base station through higher layer signaling and/or DCI, or may be configured in accordance with a size of group common DCI.

In detail, when a number of a time unit at which the pre-empted resource may be generated within the specific area is M, a size of a bit field for pre-emption indication may be set to Ceil(log 2(COMBIN(M, 1)+COMBIN (M, 2)+ . . . +COMBIN (M, N))), wherein COMBIN (p, q) may be defined as p!/(q!*(p−q)!).

Meanwhile, the aforementioned description may be summarized as follows.

(1) Option 1: The pre-empted resource is indicated within a reference time region in a bitmap.

(2) Option 2: The pre-empted resource is indicated within a reference time region in the form of pattern. At this time, the pattern may indicate the pre-empted resource generated within a reference time region N times.

(3) Option 3: A procedure of two steps for indicating the pre-empted resource may be supported. The first step indicates one or more slots at which the pre-empted resource is first generated within a reference time region. The second step indicates a symbol group corresponding to the pre-empted resource within indicates slots.

In this case, the option 3 may be categorized into option 3-1 and option 3-2. According to the option 3-1, in the first step, one of slots within the reference time region is selected as a slot at which the pre-empted resource is first generated. In the second step, a symbol group, which includes pre-empted resources existing within M slot from the indicated slot, is indicated in the form of bitmap. According to the option 3-2, the first step is the same as the option 3-1, and in the second step, pre-empted resources existing within M slot from the indicated slot, which are generated N times, are indicated in the form of pattern.

(4) Option 4: A procedure of two steps for indicating pre-empted resource may be supported.

In the first step, slots which include the pre-empted resource within the reference time region may be indicated using a bitmap. In the second step, a symbol group, which includes pre-empted resources within one slot, is indicated using a bitmap, and this information is commonly applied to the slots indicated in the first step.

FIG. 8 illustrates an embodiment of a bit field size according to each of the aforementioned options and the reference time region.

As described above, impacted resources for a time domain such as mini-slot/mini-slot group or symbol/symbol group may be indicated separately or in combination to indicate impacted resources in a frequency domain. In the next generation system, a bitmap or pattern type may be indicated in accordance with a resource block group (RBG) size configured or indicated by a method for expressing frequency domain resources, or a bandwidth part (BWP) or system bandwidth is divided in accordance with a specific value N which is configured or indicated, or an impacted resource may be indicated in the form of bitmap or pattern in accordance with the divided part.

The impacted resource may be indicated based on a resource for a PDSCH used for URLLC transmission, and may additionally include a PDCCH resource for scheduling the PDSCH, and the impacted resource may be indicated based on the PDCCH resource. Also, when a plurality of mini-slots or symbols/symbol groups indicate the impacted resource, the impacted resource indicated in the frequency domain may include a union of impacted resources in a plurality of mini-slots or symbols/symbol groups.

For example, when impacted resources for N PRB, which are continuous or not in the frequency domain, may be indicated, and impacted resources for M symbols, which are continuous or not in the time domain are indicated, the final impacted resources may be comprised of N PRB indicated per M symbol which is indicated. That is, the impacted resources may be comprised of N*M resource elements. However, this method may require configuration for unnecessarily many impacted resources, and may cause decoding throughput degradation of a PDSCH, which includes impacted resources, and/or increase of resources required during retransmission.

Meanwhile, to solve this problem, frequency domain resources may independently be configured per mini-slot/mini-slot group or symbol/symbol group. In detail, an impacted resource indication value in the frequency domain may be indicated per single or a plurality of mini-slots/mini-slot groups or symbols/symbol groups. In addition, a frequency domain impacted resource indication value for a symbol/symbol group prior to a specific time within a slot and a frequency domain impacted resource indication value for the other symbol/symbol group may exist separately.

Meanwhile, the aforementioned method may be limited to a case that the selected symbol/symbol group is a specific threshold value or more. Particularly, the specific threshold value may be limited to a case that all symbol groups are selected. Otherwise, in the aforementioned method, an indication value of a frequency domain impacted resource may separately be configured for a symbol/symbol group from a specific starting symbol to a specific order. In detail, when indication for the pre-empted resource indicates occurrence of the pre-empted resource of M times on a time axis, indication of the frequency domain resources may be M times. At this time, each frequency resource indication may correspond to occurrence of each pre-empted resource.

Furthermore, indication of the pre-empted resource may basically express occurrence of one or two pre-empted resources, and each pre-empted resource may be indicated by two frequency resource indication fields. For example, if indication of the pre-empted resources indicates all symbol groups, indication of two frequency resources may indicate frequency resources corresponding to a half of a front part and a half of a rear part of a reference time resource. Alternatively, two frequency resource indication fields may be incorporated into one and then may be used as single frequency resource indication. The aforementioned example is advantageous in that it may clarify frequency-domain granularity. Similarly, if indication of the pre-empted resource indicates the pre-empted resource generated once, two frequency resource indication fields may be incorporated into one and then may be used as single frequency resource indication. This method is advantageous in that flushed bits may be reduced using a limited payload size when the pre-empted resource is indicated.

Figure 9:
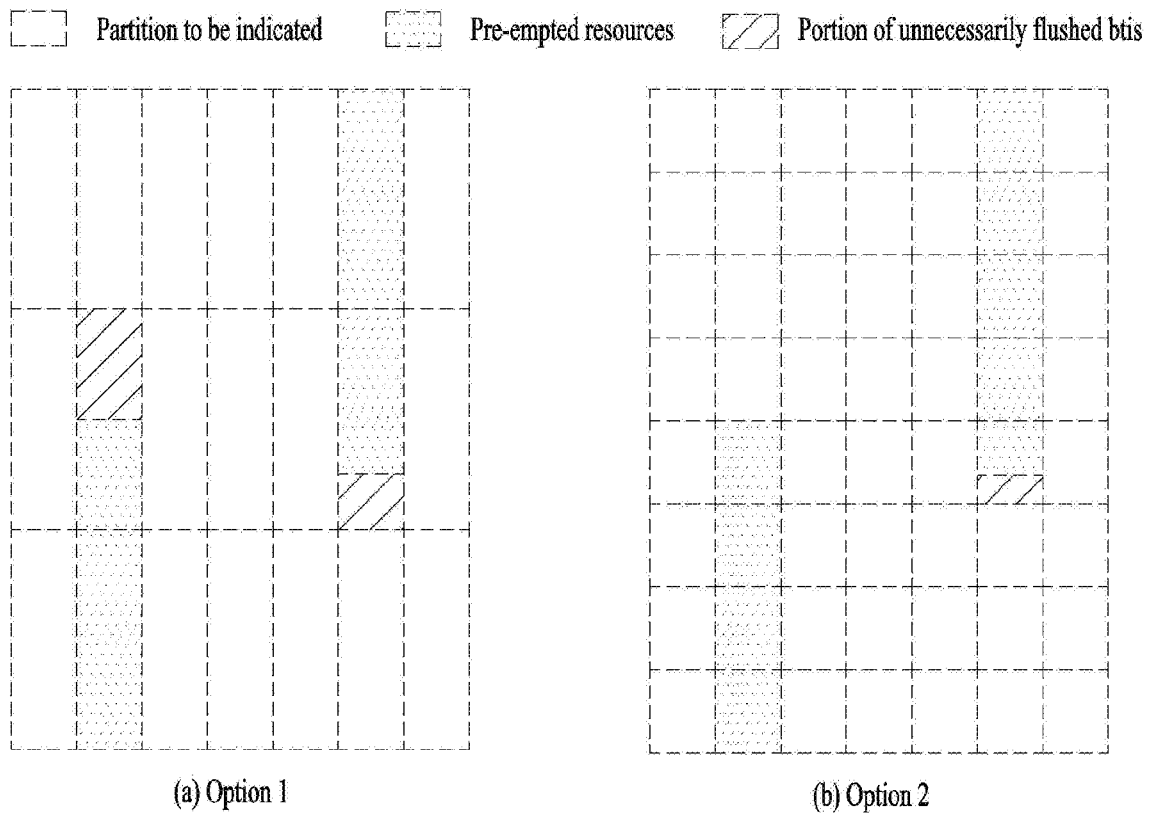
FIG. 9 illustrates an embodiment according to a method for indicating an indicator for a pre-empted resource.

FIG. 9 illustrates an embodiment for indicating a pre-empted resource, as described above, wherein FIG. 9(a) illustrates that time/frequency bitmap is used, and FIG. 9b illustrates that a pattern type indication is performed. That is, referring to FIG. 9, as shown in FIG. 9(a), if a bitmap is used, since the presence of pre-empted resources of all of time and frequency domains should be expressed in restricted bits, granularity is reduced, whereby unnecessarily flushed bits may be generated remarkably. However, as shown in FIG. 9(b), if a pattern type is used, since one pattern may be used N times, granularity may be increased, whereby unnecessarily flushed bits may be reduced.

However, if the pattern type is used as shown in FIG. 9(b), since it indicates whether the resource is pre-empted for a limited specific part, its exactness in expression may be more lowered than the bitmap. Therefore, to enhance exactness as to whether all of partitions are pre-empted, it may be preferable to use the bitmap as shown in FIG. 9(a).

Also, if the pre-empted resources are expressed in the form of bitmap, since it indicates whether each partition is pre-empted, it may be preferable to use a bitmap when pre-emption of each resource is dynamically changed.

In the next generation system, mini-slot/mini-slot group or symbol/symbol group may be indicated by the base station through RRC signaling and/or DCI. Particularly, the base station may indicate combination of time-domain granularity and frequency-domain granularity. However, in this case, as a size of a reference frequency domain which becomes an indication target of the pre-empted resource is changed, combination of another time and frequency granularity may be required.

For example, granularity of a specific direction may be indicated by the base station and granularity of another direction may be calculated based on a payload size for pre-empted resource indication. At this time, granularity of a specific direction may be time-domain granularity, and granularity of another direction may be frequency-domain granularity. In detail, if a payload size of pre-empted resource indication is P, time-domain granularity is subjected to granularity of K symbols, a size of a reference time region is T symbols and a size of a reference frequency domain is F PRBs, frequency-domain granularity may be determined in accordance with $\lfloor F/\lfloor P/\lceil T/K \rceil \rfloor \rfloor$ and/or $\lceil F/\lfloor P/\lceil T/K \rceil \rfloor \rceil$.

However, this granularity method may generate unnecessary frequency granularity, and in this case, efficiency of pre-empted resource indication may be lowered. To mitigate efficiency mitigation, the frequency-domain granularity may mean that the closest value in a previously configured set may be selected from the calculated equation.

As another embodiment, the base station may indicate a combination of the number of time domain partitions and the number of frequency domain partitions in the reference resource instead of time and frequency granularity. Otherwise, the base station may configure a ratio of time and frequency granularity to a reference resource. For example, the base station may indicate granularity for the time domain, and may calculate frequency granularity in accordance with the ratio which is configured.

In respect of the number of time domain partitions and/or the number of frequency domain partitions in the reference resource, a detailed embodiment for a method for configuring actually pre-empted resource indication information will now be described. A size of the reference time region for the pre-empted resource may not be a multiple of the number of time domain partitions. In this case, when pre-empted resource indication information is configured, how to configure time-domain granularity should be determined. Therefore, a method for determining time-domain granularity configuration will be described hereinafter. For convenience of description, it is assumed that a size of a reference time region is T symbols and the number of time domain partitions is M.

Embodiment 4-1

If the reference time region is transmitted over a plurality of slots, indication for the pre-empted resource may be performed over a plurality of slots. For example, a time domain size of each partition may be comprised of $\lfloor T/M \rfloor$ or $\lceil T/M \rceil$. That is, a size difference between partitions may be maximum 1 symbol.

In detail, the number of partitions having a size of $\lfloor T/M \rfloor$ may be $\lfloor M\lceil T/M \rceil - T \rfloor$, and the number of partitions having a size of $\lceil T/M \rceil$ may be $M - \lfloor M\lceil T/M \rceil - T \rfloor$. If the number of the aforementioned partitions is expressed in another method, the number of partitions having a size of $\lceil T/M \rceil$ may be $T - M\lfloor T/M \rfloor$, and the number of partitions having a size of $\lfloor T/M \rfloor$ may be $$M - \left(T - M\left\lfloor \frac{T}{M} \right\rfloor\right).$$

At this time, time-domain granularity or a time domain size of partitions may be limited to a specific value (K' candidate) such as 2, 4 and 7 symbols. In other words, the smallest K which satisfies M*K>=T may be determined, and the greatest K' which satisfies K'<K may be selected from 2, 4 and 7 symbols. For example, if K is determined as 7, K' may be 4. ΔK may be defined as K−K', and in the corresponding case, the number of partitions having a size of K' may be ⌊(M·K−T)/ΔK⌋, and the number of partitions having a size of K may be M−⌊(M·K−T)/ΔK⌋.

If the base station indicates a ratio between the reference time region and time-domain granularity, a value of the corresponding ratio may be indicated in the form of a multiple of 1/M, and the method described in the embodiment 4-1 may extensively be applied.

Embodiment 4-2

Indication for a pre-empted resource may be performed based on one slot even in the case that the reference time region is transmitted over a plurality of slots. That is, the pre-empted resource indicated by an indicator may be configured so as not to exceed one slot boundary.

For example, when the number of slots constituting the reference time region is P, the number M of partitions may be divided per slot. In detail, the number of partitions per slot may be ⌈M/P⌉ or ⌊M/P⌋, and the number of respective slots may be configured such that the number of slots having partitions as much as ⌊M/P⌋ may be ⌊P⌈M/P⌉−M⌋, and the number of slots having partitions as much as ⌈M/P⌉ may be P−⌊P⌈M/P⌉−M⌋. At this time, the size of each partition may be calculated based on the number of symbols within each slot and the number of partitions within each slot in accordance with the embodiment 4-1.

The above methods may have suitable options different from one another in accordance with a type of data transmission assuming actual pre-emption. Also, the above method may be applied extensively even in case of a ratio of partitions in addition to the number of partitions.

Meanwhile, the size of the reference frequency region for pre-emption may not be a multiple of the number of frequency domain partitions. In this case, when pre-empted resource indication information is configured, how to configure frequency-domain granularity should be determined. Therefore, a method for determining frequency-domain granularity configuration will be described hereinafter. For convenience of description, it is assumed that a size of a reference frequency region is F PRBs or F RBGs and the number of frequency domain partitions is N.

Embodiment 5-1

A frequency domain size of each partition may be comprised of ⌈F/N⌉ or ⌊F/N⌋. That is, a size difference between partitions may be maximum 1 PRB or 1 RBG. In detail, the number of partitions having a size of ⌊F/N⌋ may be ⌊N⌈F/N⌉−F⌋, and the number of partitions having a size of ⌈F/N⌉ may be N−⌊N⌈F/N⌉⌋. If the number of the aforementioned partitions is expressed in another method, the number of partitions having a size of ⌈F/N⌉ may be F−N⌊F/N⌋, and the number of partitions having a size of ⌊F/N⌋ may be $$N - \left(F - N\left\lfloor \frac{F}{N} \right\rfloor\right).$$

At this time, frequency-domain granularity or a frequency domain size of partitions may be limited to a specific value. At this time, the specific value may be set to one of RBG size corresponding to the power of 2 such as 1, 2, 4 and 8. In this case, the smallest K which satisfies N*K>=F is selected, and the greatest K' which satisfies K'<K is selected. For example, if K is 8, K' may be 4. ΔK may be defined as K−K', and in the corresponding case, the number of partitions having a size of K' may be ⌊(N·K·F)/ΔK⌋, and the number of partitions having a size of K may be N−⌊(N·K−F)/ΔK⌋.

If the base station indicates a ratio between the reference frequency region and frequency-domain granularity, a value of the corresponding ratio may be indicated in the form of a multiple of 1/N, and the method described in the embodiment 3-1 may extensively be applied.

Embodiment 5-2

A frequency domain size of each partition except one of partitions subjected to granularity includes ⌈F/N⌉ or ⌊F/N⌋, and a size of the other partitions includes F−(N−1)·⌊F/N⌋+ or F−(N−1)·⌈F/N⌉.

If the base station indicates a ratio between the reference frequency region and frequency-domain granularity, it may be assumed that a value of the corresponding ratio is indicated in the form of a multiple of 1/N, and the method described in the embodiment 3-2 may extensively be applied.

Also, the above method may be applied extensively to the aforementioned embodiments 4-1 and 4-2 even in case of the ratio in addition to the number of partitions.

Meanwhile, when an impacted resource is indicated, the impacted resource may be indicated by combination of time and domain resources. For example, candidates of an impacted resource indication value may be configured previously or through higher layer signaling by combination of time and frequency resources, and one or a plurality of candidates of the configured candidates may be indicated through a signal for indicating a pre-empted resource.

The indication signal may be information required for efficient distribution and use of resources and demodulation and decoding in transmission and reception of data traffics of different services having their respective service requirements and/or scheduling units different from each other. Therefore, if the indication signal is impacted by another signal, or if a UE is failed in corresponding signal detection, degradation may be generated even in view of entire throughput. Therefore, it may be considered that an indication signal, which includes the same or superposed information, is repeatedly transmitted to increase reliability.

For example, an indication signal transmitted per mini-slot/mini-slot group may include information on associated mini-slot/mini-slot group. In detail, if a current mini-slot/mini-slot group is a downlink mini-slot/mini-slot group, the indication signal may include information on current mini-slot/mini-slot group. On the other hand, if a current mini-slot/mini-slot group is an uplink mini-slot/mini-slot group, the indication signal may include information on mini-slot/mini-slot group after a specific time and information on an impacted resource before and/or after the current time. That is, the indication signal transmitted per mini-slot/mini-slot group may include an impacted resource for mini-slot/mini-slot group until the current time within the same slot. On the other hand, the indication signal may be transmitted regardless of the presence of occurrence of the impacted resource after the time when the impacted resource is generated.

In another way, an indication signal, which includes brief information, may be transmitted per mini-slot/mini-slot group like the presence of the impacted resource, and if the impacted resource exists within a slot, an indication signal, which includes an impacted resource for the corresponding slot, may additionally be transmitted to the last mini-slot of the slot. At this time, the indication signal additionally transmitted may include impacted resource information on a plurality of mini-slots/mini-slot groups. In this case, demodulation and decoding for the impacted resource may be performed through another indication signal even in the case that the UE partially fails to detect the indication signal.

Meanwhile, the indication signal may be transmitted in the form of a soft-buffer handling indicator within DCI for scheduling PDSCH or PUSCH together with a signal comprised of indication information on a pre-empted resource. In detail, a pre-empted resource indicator may indicate an impacted resource in the form of time and/or frequency resource, and the soft-buffer handling indicator may express an impacted resource per transport block or code block group, wherein corrupted coded bits within the soft buffer may be identified in accordance with a corresponding value and the UE may flush the corresponding bits.

Embodiments of a method for specifying corrupted coded bits that may be flushed from the soft buffer based on indication information of the plurality of pre-empted resources will be described.

Embodiment 6-1

Of the pre-empted resource indicator and the soft handling indicator, based on information transmitted later, the corrupted coded bits are configured. Since the two indicators are information indicated and transmitted by the base station, it may be useful to repeatedly transmit the two indicators multiple times to update information on an impacted resource.

Embodiment 6-2

A specific indicator may always first be used to specify corrupted coded bits. In detail, a soft buffer handling indicator within DCI for scheduling PDSCH or PUSCH may always preferentially used. If the base station supports the soft buffer handling indicator while transmitting the pre-empted resource indicator, it may be regarded that the base station intends to use the soft buffer handling indicator. Therefore, if the soft buffer handling indicator is not used, it may correspond to unnecessary configuration.

Embodiment 6-3

Corrupted coded bits may be specified by combination of information of the pre-empted resource indicator, information of the soft buffer handling indicator and/or indicated code block group information. In detail, corrupted coded bits may be specified based on intersection or union of coded bits indicated by the two indicators.

Embodiment 6-4

Whether the pre-empted resource indicator is used may be varied depending on a value of the soft buffer handling indicator. For example, if the soft buffer handling indicator is disabled, corrupted coded bits are specified based on the information of the pre-empted resource indicator. This case is useful in that soft-buffer combining or soft-buffer flushing may be performed differently for coded bits related to pre-empted resources and the other coded bits. If the soft buffer handing indicator is enabled, corrupted coded bits may be specified based on the value of the soft buffer handling indicator, or may be specified by combination of information of the pre-empted resource indicator, information of the soft buffer handling indicator and/or indicated code block group information.

Meanwhile, the indication signal may be transmitted by the base station per UE impacted for specific signal transmission by the pre-empted resource. In this case, each UE may attempt to detect the indication signal through its allocated resource, and may properly perform downlink reception or uplink transmission based on its information.

On the other hand, the indication signal may be transmitted UE group-commonly. In this case, a plurality of UEs may attempt to detect the indication signal from a UE group-specific resource, and may properly perform downlink reception or uplink transmission based on information included in the indication signal and scheduling information.

The embodiment, which will be described later, relates to a method for configuring a resource for transmitting a UE-specific indication signal.

Embodiment 7-1

A resource for the indication signal may be configured in conjunction with scheduling information on PDSCH which includes an impacted resource. For example, the resource for the indication signal may be a part of a PDSCH resource which includes an impacted resource and/or a peripheral resource of the PDSCH resource. At this time, the peripheral resource of the PDSCH resource may be PRB or PRB group up and down on a frequency axis. If the indication signal is mapped into a part of the PDSCH resource, the resource into which the indication signal is mapped may be determined by a predefined rule, or a candidate resource in the PDSCH resource which includes an impacted resource may be selected from one or more candidate resources configured through higher layer signaling. At this time, the predefined rule may be based on that the indication signal is mapped into a frequency having the lowest and/or highest index.

Embodiment 7-2

Separately from the PDSCH which includes an impacted resource, the base station may independently configure a resource region, to which the indication signal is transmitted, through a higher layer or DCI. That is, the resource to which the indication signal is transmitted may be designated UE-specifically. In this case, CDM may be supported among a plurality of indication signals, whereby the resource may be used efficiently in accordance with a configuration.

Meanwhile, the resource may partially be superposed on the indication signal and the PDSCH. If the indication signal and the PDSCH are for the same UE, the resource for indication signal transmission may be punctured or rate matched for the corresponding PDSCH. If a resource for an indication signal of a specific UE is superposed on a PDSCH for another UE by MU-MIMO, the base station may separately indicate, to the specific UE, a candidate resource set, which becomes a target of puncturing and/or rate matching, through higher layer signaling or DCI, and may perform puncturing and/or rate matching for the corresponding candidate resource set regardless of the presence of transmission of the indication signal.

Distinctively, the candidate resource set may be a superset of resources for a plurality of UE-specific indication signals. At this time, the PDSCH may be a PDSCH for eMBB having a relatively long scheduling unit, or may be a PDSCH for URLLC having a relatively short scheduling unit. Also, if the PDSCH is URLLC PDSCH, it may be considered that the indication signal is also punctured. In this case, a scheduler may perform resource allocation to minimize superposition between two signals.

Particularly, if URLLC data are only transmitted and eMBB data are not transmitted, the base station may indicate whether rate matching or puncturing for the indication signal or reserved resource is performed for the URLLC data, through higher layer signaling or URLLC scheduling DCI.

The indication signal may be UE group common signal. At this time, the candidate resources for the indication signal may be configured group commonly through higher layer signaling. Also, the indication signal may be transmitted by resource allocation per subband or PRB group. That is, for a cell which supports a wideband operation, a specific UE may perform signal transmission and reception for some subband only. Therefore, in this case, the indication signal for a plurality of frequency resources may be required to be transmitted. At this time, information transmitted through the indication signal for the plurality of frequency resources may be information on an impacted resource for a subband or PRB group to which the corresponding signal is transmitted. In this case, the information on an impacted resource may indicate information as to whether the impacted resource exists or information on a resource configured as an impacted resource.

Also, to enhance reliability, or to reduce detection attempt of the indication signal, impacted resource information on a plurality of subbands or PRB groups may be included in the indication signal transmitted to each subband and PRB group.

Meanwhile, the indication signal may be superposed on some resource for PDSCH. In this case, puncturing or rate matching may be performed regardless of the presence of transmission of a resource reserved for the indication signal. Otherwise, the base station may perform puncturing or rate matching for the resource to which the indication signal is actually transmitted when transmitting the PDSCH. In this case, the UE may recognize whether some resource for the signal received in accordance with a detected result of a group common indication signal has been punctured or rate matched by the indication signal.

At this time, the PDSCH may be a PDSCH for eMBB having a relatively long scheduling unit, or may be a PDSCH for URLLC having a relatively short scheduling unit. Also, if the PDSCH is URLLC PDSCH, it may be considered that the indication signal is also punctured. In this case, a scheduler may perform resource allocation to minimize superposition between two signals.

Meanwhile, in the next generation system, it is considered that the pre-empted resource indication signal is transmitted through group common DCI. At this time, a transmission period or a monitoring period or monitoring occasion of the group common DCI may be configured to be greater than a slot. In this case, time and/or frequency region that may be indicated by one pre-empted resource indication signal may be referred to as a reference region, and a proper value of the reference region may be configured for each domain.

Preferably, the reference time region should be configured to be greater than or equal to a monitoring period for the pre-empted resource indication signal. If the reference time region is smaller than the monitoring period for the pre-empted resource indication signal, a region that cannot be indicated through the pre-empted resource indication signal occurs, whereby there may be a limitation in reducing throughput degradation caused by the pre-empted resource.

Hereinafter, detailed embodiments for configuring the reference time region will be described.

Embodiment 8-1

The reference time region may be configured equal to the monitoring period for the pre-empted resource indication signal. However, if the monitoring period is configured to be short, scheduling flexibility for pre-empted resource indication signaling may be reduced.

Therefore, as shown in FIG. 10(a), the reference time region is basically configured in accordance with the monitoring period of the pre-empted resource indication signal, but a lower limit value exists in the reference time region. Therefore, if the monitoring period of the pre-empted resource indication signal is a specific threshold value or more, as shown in FIG. 10(b), the reference time region is set to a specific value. In this case, the specific value may be a fixed value, or may be a maximum value or minimum value of HARQ RTT.

Also, in FIGS. 10(a) and 10(b), P indicates a monitoring period of the pre-empted resource indication signal, and X means a specific threshold value.

Embodiment 8-2

The reference time region may be set to a multiple of K of the monitoring period for the pre-empted resource indication signal. The K may be indicated by the base station through higher layer signaling and/or DCI.

Embodiment 8-3

Basically, the pre-empted resource indication signal should be transmitted earlier than retransmission corresponding to downlink transmission including the pre-empted resource.

Therefore, as shown in FIG. 11(a), the reference time region may be configured based on HARQ RTT (Round Trip Time) or downlink data-to-HARQ-ACK feedback timing. In this case, HARQ RTT may mean the time when a timing difference between initial transmission and retransmission corresponding to the initial transmission becomes a minimum value.

Meanwhile, in the next generation system, scheduling timing may be changed dynamically, and the pre-empted resource indication signal may be configured group commonly. Therefore, the reference time region may be set to minimum value/maximum value/default value among the values available as the HARQ RTT or downlink data-to-HARQ-ACK feedback timing.

Embodiment 8-4

The reference time region is configured based on the monitoring period for the pre-empted resource indication signal and HARQ RTT or downlink data-to-HARQ-ACK feedback timing.

In detail, the reference time region is configured based on the monitoring period for the pre-empted resource indication signal and the maximum value of the HARQ RTT or downlink data-to-HARQ-ACK feedback timing values. In the next generation system, scheduling timing may be changed dynamically. Therefore, the reference time region may be set to minimum value/maximum value/default value among the values available as the HARQ RTT or downlink data-to-HARQ-ACK feedback timing.

In case of the reference frequency region, the base station may indicate start/end/interval through higher layer signaling.

UEs which receive the pre-empted resource indication signal may have a different bandwidth part (BWP) configured for each UE. Therefore, indexing for a frequency domain resource may also be different. On the other hand, since the pre-empted resource indication signal is transmitted group commonly, if the pre-empted resource on the frequency axis is indicated, indexing for the corresponding pre-empted resource is also required group commonly. For example, numbering or indexing may be performed in an ascending order from the lowest frequency region by starting from the region configured as the reference frequency region. Otherwise, group common indexing within the corresponding carrier may be used as it is.

<Method for Indicating Pre-Empted Resource for Scell>

In the next generation system, pre-empted resource indication for a plurality of cells may be transmitted by joint encoding to single DCI. In this case, a reference resource for each pre-empted resource indication of each cell may be allocated. A reference resource for a PCell or a serving cell to which corresponding DCI is transmitted may be configured as a region from a first symbol of a previous monitoring occasion to a previous symbol of a first symbol of the current monitoring occasion on a time axis. Additionally, a symbol indicated by an uplink may be excluded from the reference resource by UL-DL-configuration-common. It may be assumed that the reference resource is the same as a downlink bandwidth part (BWP), to which corresponding DCI is transmitted, on a frequency axis.

Meanwhile, in indication of SCell or a pre-empted resource, it is required to define a reference resource for a serving cell, which is transmitted from another cell.

On the time axis, an absolute time duration configured based on a monitoring period of DCI, that is, a reference resource set to a fixed value may be configured equally in all serving cells. That is, if numerology is different per serving cell, scaling may be performed based on different numerologies.

For example, it is assumed that a period is T and numerology configuration is u_ref with respect to DCI including a Pre-emption Indicator (PI). When numerology configuration for a specific serving cell is u, the reference time region may include $14 \times 2^{u-u\_ref} \times T$ symbols or $\lceil 14 \times 2^{u-u\_ref} \times T \rceil$ symbols of a previous period.

In detail, if a subcarrier spacing of a serving cell corresponding to a pre-empted resource indication field is smaller than a subcarrier spacing corresponding to an actual pre-empted resource indication transmission, the pre-empted resource indication field may be configured at a subcarrier spacing corresponding to actual pre-empted resource indication transmission. In this case, it is assumed that actual symbol superposed on the indicated symbol is pre-empted.

Meanwhile, it may be considered that uplink symbol is excluded from the reference time region in the same manner as a single cell. However, SCell may not receive UL-DL-configuration-common. Therefore, even though uplink symbol is excluded from the reference time region for PCell or a serving cell to which DCI is transmitted including pre-empted resource indication, based on UL-DL-configuration-common, there may be no symbol additionally excluded from the other serving cells.

UL-DL-configuration-dedicated-SCell indicating downlink symbol, uplink symbol, and flexible symbol may be configured for each serving cell, and the reference time region may be updated based on the configured UL-DL-configuration-dedicated-SCell. Alternatively, when pre-empted resource indication is configured, symbol information which is excluded may be configured per cell and a specific symbol may be excluded based on the corresponding configuration.

On the frequency axis, when it is assumed that an active bandwidth part (BWP) is always the same for all UEs, a restriction may occur in bandwidth part switching in SCell. As a method for solving this, a reference BWP or resource block (RB) set may be configured through pre-emption indication configuration.

A target of the above configuration may be limited to SCell or a cell to which DCI (PI DCI) having pre-empted resource indicator is not transmitted. Otherwise, a default BWP or initial BWP of the corresponding SCell may be configured as a reference frequency region for the pre-empted resource indicator (PI). Meanwhile, UEs having different actual active BWPs may disregard information included in the corresponding pre-empted resource indicator (PI).

Meanwhile, when the pre-empted resource indication for a plurality of cells is transmitted through single DCI, time and frequency granularity may be configured independently per cell. That is, information on the number of partitions is not required to be applied to all cells, and may be configured per cell in pre-empted resource indication configuration or may be configured independently for PCell and SCell. Alternatively, since it may be difficult to configure reference frequency resources for SCell, (M, N) may always be assumed as (14, 1). That is, only pre-empted resource information on the time domain may be indicated for the SCell. The SCell may mean a cell which receives pre-empted resource indication from another cell.

Figure 12:
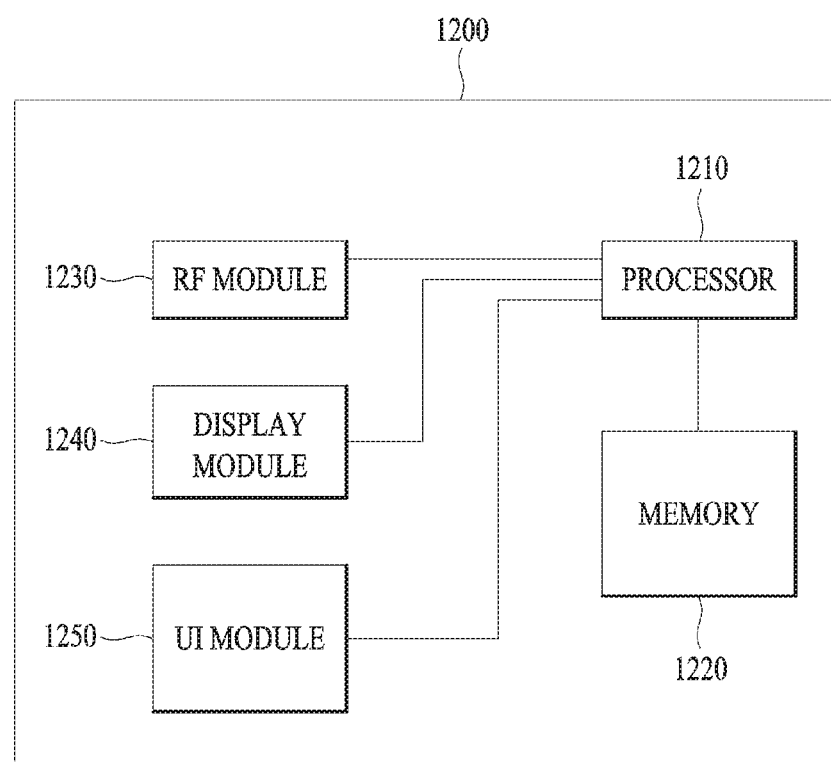
FIG. 12 is a block diagram of a communication apparatus according to an embodiment of the present disclosure.

Referring to FIG. 12, a communication apparatus 1200 includes a processor 1210, a memory 1220, an RF module 1230, a display module 1240, and a User Interface (UI) module 1250.

The communication apparatus 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present disclosure described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the aforementioned method for indicating pre-empted resource information in a wireless communication system and the apparatus therefor have been described based on the 5th generation NewRAT system, the method and the device may be applied to various mobile communication systems.

The invention claimed is:

1. A method for transmitting a downlink signal by a base station (BS) in a wireless communication system, the method comprising:
transmitting information for informing whether a downlink signal is transmitted in each of a plurality of durations included in a specific time region; and
transmitting the downlink signal based on the information,
wherein a number of the plurality of durations is M,
wherein the plurality of durations include i) one or more first durations in which each of the first durations has a first size and ii) one or more second durations in which each of the second durations has a second size, and
wherein the first size is defined by Ceil(T/M), and the second size is defined by Floor(T/M),
where T denotes a number of symbols of the specific time region.

2. The method according to claim 1, wherein the first size and the second size are different.

3. The method according to claim 1, wherein a number of the one or more first durations having the first size is M−Floor(M×Ceil(T/M)−T) and a number of the one or more second durations having the second size is Floor(M×Ceil(T/M)−T).

4. The method according to claim 1, wherein the plurality of durations are configured for the specific time region and a specific frequency region.

5. The method according to claim 1, wherein the specific time region includes the plurality of durations and a time region for uplink transmission.

6. The method according to claim 1, wherein the information includes a plurality of bits for informing whether the downlink signal is transmitted in each of the plurality of durations.

7. A base station (BS) for transmitting a downlink signal in a wireless communication system, the BS comprising:
at least one transceiver;
at least one processor; and
at least one computer memory operably connectable to the at least one processor and storing instructions that, when executed by the at least one processor, perform operations comprising:
transmitting, via the at least one transceiver, information for informing whether a downlink signal is transmitted in each of a plurality of durations included in a specific time region; and
transmitting, via the at least one transceiver, the downlink signal based on the information,
wherein a number of the plurality of durations is M,
wherein the plurality of durations include i) one or more first durations in which each of the first durations has a first size and ii) one or more second durations in which each of the second durations has a second size, and
wherein the first size is defined by Ceil(T/M), the second size is defined by Floor(T/M),
where T denotes a number of symbols of the specific time region.

8. The BS according to claim 7, wherein the first size and the second size are different.

9. The BS according to claim 7, wherein a number of the one or more first durations having the first size is M−Floor(M×Ceil(T/M)−T) and a number of the one or more second durations having the second size is Floor(M×Ceil(T/M)−T).

10. The BS according to claim 7, wherein the plurality of durations are configured for the specific time region and a specific frequency region.

11. The BS according to claim 7, wherein the specific time region includes the plurality of durations and a time region for uplink transmission.

12. The BS according to claim 7, wherein the information includes a plurality of bits for informing whether the downlink signal is transmitted in each of the plurality of durations.

* * * * *